(12) United States Patent
Matsui et al.

(10) Patent No.: US 7,731,200 B2
(45) Date of Patent: Jun. 8, 2010

(54) SEAL ASSEMBLY, AND ROLLING BEARING AND HUB UNIT ASSEMBLED THEREWITH

(75) Inventors: Masahito Matsui, Fujisawa (JP); Kinji Yukawa, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/715,890

(22) Filed: Mar. 9, 2007

(65) Prior Publication Data

US 2007/0152403 A1 Jul. 5, 2007

Related U.S. Application Data

(62) Division of application No. 10/504,528, filed as application No. PCT/JP03/01259 on Feb. 6, 2003, now abandoned.

(30) Foreign Application Priority Data

Feb. 14, 2002 (JP) .............................. 2002-037306
Dec. 16, 2002 (JP) .............................. 2002-363579

(51) Int. Cl.
*F16J 15/02* (2006.01)
(52) U.S. Cl. ...................................... 277/551; 277/560
(58) Field of Classification Search ................. 277/549, 277/551, 560, 562; 384/94, 143, 119, 130
See application file for complete search history.

(56) References Cited

U.S. PATENT DOCUMENTS

| 3,892,418 A | 7/1975 | Felt |
| 3,921,992 A | 11/1975 | Bertin |
| 5,382,098 A | 1/1995 | Rigaux et al. |
| 5,803,617 A | 9/1998 | Ohnuki et al. |
| 5,947,611 A | 9/1999 | Nagase |
| 5,967,527 A | 10/1999 | Fabro et al. |
| 6,059,663 A | 5/2000 | Jones et al. |
| 6,082,905 A | 7/2000 | Vignotto et al. |
| 6,206,380 B1 | 3/2001 | Miyazaki |
| 6,561,337 B2 | 5/2003 | Takeda et al. |
| 6,637,754 B1 | 10/2003 | Ohtuski et al. |
| 6,979,001 B2 | 12/2005 | Ohtsuki et al. |
| 7,004,471 B2 | 2/2006 | Bryde et al. |

FOREIGN PATENT DOCUMENTS

DE 43 39 894 A1 5/1994

(Continued)

*Primary Examiner*—Vishal Patel
(74) *Attorney, Agent, or Firm*—Crowell & Moring LLP

(57) ABSTRACT

A seal member with its base end connected to a metal core has three seal lips. The thickness of the tip end of the intermediate seal lip in the intermediate position is $d_1$, and the thickness of the base end is $d_2$. The thickness of the tip end of the innermost inner seal lip is $D_1$ and that thickness of the base end is $D_2$. In this case, at least part of the base end of the intermediate seal lip and inner seal lip has its thickness regulated to be $0.2 \cdot d_1 \leq d_2 \leq 0.8 \cdot d_1$, and $0.5 \cdot D_1 \leq D_2 < D_1$. The tip edge of the inner seal lip is fitted onto the outer peripheral surface of the radially inside cylindrical portion of a slinger with substantially zero interference. Consequently, even if the slinger and metal core are displaced relative to each other, excellent seal performance is secured while increase of torque is inhibited.

3 Claims, 27 Drawing Sheets

FOREIGN PATENT DOCUMENTS

| | | |
|---|---|---|
| DE | 10056175 A1 | 6/2001 |
| EP | 0 864 770 A1 | 9/1998 |
| EP | 0 902 203 A1 | 3/1999 |
| JP | 63-16929 Y2 | 5/1988 |
| JP | 4-62966 U | 5/1992 |
| JP | 5-73364 U | 10/1993 |
| JP | 5-73365 U | 10/1993 |
| JP | 7-34260 U | 6/1995 |
| JP | 2507600 Y2 | 5/1996 |
| JP | 9-287619 A | 11/1997 |
| JP | 10-252762 A | 9/1998 |

Circumferential position of the contact section
between the inner seal lip and the slinger

SEAL ASSEMBLY, AND ROLLING BEARING AND HUB UNIT ASSEMBLED THEREWITH

CROSS REFERENCE TO RELATED APPLICATIONS

This application is a divisional U.S. patent application Ser. No. 10/504,528 filed Jan. 7, 2005 which is a National Stage of Patent Application No. PCT/JP03/01259 filed Feb. 6, 2003, which claims priority under 35 U.S.C. §119 to Japanese Patent Application Nos. 2002-037306 filed Feb. 14, 2002 and 2002-363579 filed Dec. 16, 2002, the entire disclosures of which are herein expressly incorporated by reference. This application contains subject matter which is related to the subject matter contained in application Ser. No. 11/715,891, filed on even date herewith.

TECHNICAL FIELD

The seal assembly, the rolling bearing and the hub unit in accordance with the present invention are related, for example, to an improvement of the seal assembly for rolling bearing to be incorporated into the rotatable supporting structure of the support device etc. for the wheels of an automobile or the like.

BACKGROUND OF THE INVENTION

The rotatable supporting structures of various types of mechanical devices are assembled with a rolling bearing such as a ball bearing, a cylindrical roller bearing, a tapered roller bearing or the like. This kind of a rolling bearing is provided with a seal assembly for the purpose of preventing the grease applied inside of this rolling bearing from leaking out of the rolling bearing, and also preventing various types of foreign objects such as rain water, mud, dust and the like from entering the inside of the rolling bearing. FIGS. 25 to 27 show three exemplary structures of the seal assembly provided at the opening of the end portion of a rolling bearing for this purpose.

First, the prior art structure as a first example illustrated in FIG. 25 is described in JP Patent Publication No. Tokukai Hei 10-252762 is composed of a metal core 5, a slinger 6 and a sealing member 7. The metal core 5 among these elements is formed as a generally annular ring having an L-shaped cross section, and composed of a radially outer cylindrical portion 9 which can be internally fitted and fixed to the inner peripheral surface of the end portion of an outer race 8 and an inner circular ring portion 10 which is bent inwardly in the radial direction at the inner end edge of this radially outer cylindrical portion 9 in the axial direction (the end edge located near the center of the rolling bearing in the axial direction, i.e., the left end edge as illustrated in FIG. 25). Also, the above slinger 6 is formed as an annular ring having an L-shaped cross section, and composed of a radially inner cylindrical portion 12 which can be externally fitted and fixed to the outer peripheral surface of the end portion of an inner race 11 and an outer circular ring portion 13 which is bent outwardly in the radial direction at the axially outer end edge of this inner cylindrical portion 12 (the end edge located near the opening of the rolling bearing in the axial direction, i.e., the right end edge as illustrated in FIG. 25). Furthermore, the above sealing member 7 is made of a resilient member, for example, an elastomer such as a rubber, and provided with three seal lips 14 to 16, i.e., an outer, an intermediate and an inner seal lip, whose base end portion is fixedly connected to the above metal core 5. The outer seal lip 14, which is provided in the most outer location, has its tip edge to be in slidable contact with the inner surface of the outer circular ring portion 13 of the slinger 6. On the other hand, the intermediate seal lip 15 and the inner seal lip 16, which are the remaining two seal lips, have their tip edges to be in slidable contact with the outer peripheral surface of the radially inner cylindrical portion 12 of the above slinger 6.

Also, in the first example as illustrated in FIG. 25, the thickness of the outer seal lip 14, which is located in the outermost position among these three seal lips 14 to 16 of the above sealing member 7, is gradually decreasing from the base end portion to the tip edge. Furthermore, the thickness of the inner seal lip 16, which is located in the most inner position, is gradually decreasing from the base end portion to the tip edge in the same manner. This inner seal lip 16 is tilted in the direction such that it goes outwardly in the axial direction of the rolling bearing toward the tip edge thereof. Also, the intermediate seal lip 15 located in the intermediate position has a thin base end portion, a thin tip edge and a thick intermediate portion.

Furthermore, the prior art structure as a second example illustrated in FIG. 26 is approximately similar as that of the above first example illustrated in FIG. 25. Particularly, in the case of this example, an outer seal lip 14a, which is located in the most outer position among these three seal lips 14a, 15a and 16, has the nearly same thickness throughout the entire length from the base end portion to the tip edge thereof. On the other hand, the intermediate seal lip 15a located in the intermediate position is designed to have a base end portion thinner than the tip end portion thereof. In contrast to this, in the case of the prior art structure as a third example illustrated in FIG. 27, the thickness of the outer seal lip 14 is gradually decreasing from the base end portion to the tip edge thereof in the same manner as illustrated in FIG. 25 showing the first example. The other structure of the third example is similar as that of the second example as illustrated in FIG. 26.

In any prior art structure of the first to third examples as described above, the opening of the end portion of the rolling bearing is blocked with the slinger 6 slidably contacting the tip edge of the seal lip 14, 14a, 15, 15a or 16 of the sealing member 7. This result in preventing the grease applied inside of this rolling bearing from leaking out of the rolling bearing, and also preventing various types of foreign matters such as rain water, mud, dust and the like from entering the inside of the rolling bearing.

There is desired, in the case of the three exemplary prior art structures as illustrated in FIG. 25 to FIG. 27, the improvement of the following points. That is, for example, in the case where the three exemplary prior art structures are applied to a rolling bearing to be incorporated into the support device for the wheels of an automobile, there may occurs a relative tilt between the inner race 11 with the externally fitted slinger 6 and the outer race 8 with the internally fitted metal core 5 (misalignment between the central axes of the respective members 11 and 8) when the automobile takes a rapid turn. If the inner and outer races 11 and 8 are relatively tilted, the above slinger 6 and the metal core 5 move partially close to each other so that the above respective seal lips 14, 14a, 15, 15a and 16 are excessively compressed. Also, if the inner race 11 is decentered from the outer race 8 for some reason, the above respective seal lips 14, 14a, 15, 15a and 16 may be excessively compressed. When the respective seal lips 14, 14a, 15, 15a and 16 are excessively compressed, the so-called pressing force is increased which is a force urging the tip edge of the seal lips 14, 14a, 15, 15a and 16 against the slinger 6. Because of this, the tip edges of the respective seal lips 14, 14a, 15, 15a and 16 tend to wear, and therefore the sealing performance is degraded at the slidably contacting region between the slinger 6 and the respective seal lips 14, 14a, 15, 15a and 16. Also, in this case, the rotating torque applied to the rolling bearing increases. Furthermore, if the inner and outer races 11 and 8 are relatively tilted, the peripheral surfaces of both the inner and outer races 11 and 8 move partially apart from each other to decrease pressing force of the seal lips 14, 14a, 15, 15a and 16 and increase the degree of risk that rain water and the like enters the inside of the seal assembly. Taking into consideration this situation, it is thought to increase the initial interference of the above seal lips 14, 14a, 15, 15a and 16 to increase the above pressing force in whole. However, in this case, when the inner and outer races 11 and 8 are relatively tilted, the pressing force of the above seal lips 14, 14a, 15, 15a and 16 can be furthermore increased near the peripheral surfaces thereof close to each other. Because of this, the tip edges of the respective seal lips 14, 14a, 15, 15a and 16 would wear, and therefore the sealing performance would be furthermore degraded. Also, the rotating torque applied to the rolling bearing would increase.

In any prior art structure of the three examples as described above, the interference between the slinger 6 and the tip edges of the intermediate seal lips 15 and 15a and the outer seal lips 14 and 14a is not suitably controlled. On the other hand, if this interference is excessive, the tip edges of the above intermediate and outer seal lips 15, 15a, 14 and 14a tend to wear, and therefore the sealing performance is degraded in the long term use at the slidably contacting region between the slinger 6 and the respective the seal lips 15, 15a, 14 and 14a. Also, in this case, the rotating torque applied to the rolling bearing (rotational resistance) increases. Conversely, if the interference between the slinger 6 and the tip edges of the above intermediate and outer seal lips 15, 15a, 14 and 14a is excessively small, the pressing force of the respective seal lips 15, 15a, 14, 14a against the slinger 6 is excessively decreased. In this manner, also in the case where the pressing force is excessively decreased, the sealing performance is degraded at the respective slidably contacting regions. The inventors of the present invention therefore considered that the above interference needs to be controlled within an appropriate range for the purpose of improving the sealing performance of the respective slidably contacting regions.

Also, in the case of the second exemplary prior art structure as illustrated in FIG. 26, since the outer seal lip 14a has the nearly same thickness throughout the entire length from the base end portion to the tip edge, there are the following shortcomings to be improved. Namely, if the outer seal lip 14a has the nearly same thickness throughout the entire length in this manner, this outer seal lip 14a tends to excessively bend at the base end portion (the root portion) when this outer seal lip 14a is urged against the slinger 6. When the outer seal lip 14a excessively bends at the base end portion (the root portion), a large strain is generated near the base end portion. Because of this, the motion following performance of the outer seal lip 14a responsive to the surface movement of the slinger 6 is degraded by the increasing resistance against the elastic deformation of the sealing member 7 made of a resilient member such as a rubber or the like. Also, in this case, since the stress relaxation occurs in the vicinity of the above base end portion, the pressing force of the above outer seal lip 14a on the above slinger 6 is decreased with the elapse of time. Accordingly, after long term use, the sealing performance tends to be degraded at the slidably contacting region between this outer seal lip 14a and the above slinger 6.

In contrast to this, in the case where the thickness of the outer seal lip 14 is gradually decreasing from the base end portion to the tip edge as illustrated in FIG. 25 and FIG. 27 showing the first and third examples, the strain in the vicinity of the base end portion can be decreased. However, the strain at the tip end portion of the above outer seal lip 14 is large instead. For this reason, in the same manner as the above second example, the motion following performance of the outer seal lip 14 responsive to the surface movement of the slinger 6 is degraded, and the pressing force of this outer seal lip 14 is decreased in the long term use. Also, in this case, as illustrated in FIG. 27 showing the above third example, the tip end portion of the outer seal lip 14 tends to come into surface contact (surface-to-surface contact) with the inner side surface of the outer circular ring portion 13 constituting the slinger 6. Then, when the tip end portion of the outer seal lip 14 comes into surface contact in this manner, the surface pressure is greatly decreased at the contact portion between the tip end portion of this outer seal lip 14 and the inner side surface of the outer circular ring portion 13 such that the sealing performance is easily degraded.

Also, in practical use of the seal assembly for the rolling bearing, the slinger 6 rotates with displacement in the axial and radial directions relative to the sealing member 7 in accordance with the misalignment of the respective components, the elastic deformation thereof and so forth. Because of this, even in the case where the outer seal lip 14a has the nearly same thickness throughout the entire length as illustrated in FIG. 26 showing the above second example, the above outer seal lip 14a can come into surface contact with the inner surface of the outer circular ring portion 13 when the slinger 6 moves toward the sealing member 7. Incidentally, if the entire length of the above outer seal lips 14 and 14a is made small, it is possible to suppress the above surface-to-surface contact. However, in this case, it becomes difficult to secure the sealing performance when the above slinger 6 moves apart from the above sealing member 7. Taking into consideration the above situation, the above outer seal lips 14 and 14a cannot be shortened so much.

On the other hand, in the three exemplary prior art structures as described above, when a hard foreign matter is bitten at the slidably contacting region between the tip edge of the outer seal lips 14 and 14a and the inner side surface of the outer circular ring portion 13, the abrasion at this slidably contacting region excessively progresses. The sealing performance at the above slidably contacting region is therefore largely lowered in a short period of time after the excessive progress of abrasion. In contrast to this, it is thought to prevent the above foreign matter from being bitten by increasing the pressing force of the outer seal lips 14 and 14a onto the slinger 6. However, in this case, the abrasion of the tip edge of the outer seal lips 14 and 14a is even more likely to make it difficult to secure a sufficient sealing performance. Also, it is thought to provide another seal lip, as a part of the sealing member 7, projecting from a position apart from the base end portion of the outer seal lips 14 and 14a for the purpose of preventing foreign matter from being bitten at the slidably contacting region between the tip edge of the outer seal lips 14 and 14a and the inner surface of the outer circular ring portion 13 by means of this another seal lip. However, the provision of such another seal lip may increase the torque of the rolling bearing and substantially raise the cost of the seal assembly for the rolling bearing.

Taking into consideration the above circumstances, the present invention is made for the purpose of improving the sealing performance of a seal assembly.

DISCLOSURE OF THE INVENTION

The seal assemblies according to the present invention are installed in a rolling bearing with an inner raceway provided in the outer peripheral surface of an inner race and an outer raceway provided in the inner peripheral surface of an outer race together with a plurality of rolling members provided therebetween to enable the relative rotation between the above inner and outer races, for the purpose of sealing between the outer peripheral surface of the end portion of the inner race and the inner peripheral surface of the end portion of the outer race.

Among such seal assemblies of the present invention, the seal assembly according to a first aspect is provided with a support member and a sealing member. The support member among them is fixed to one of the outer peripheral surface of the end portion of the inner race and the inner peripheral surface of the end portion of the outer race. On the other hand, the above sealing member is made of a resilient member and provided with a plurality of seal lips and a portion which is securely connected to the above support member. Then, the tip edge of the inner seal lip, which is located in the innermost position among the plurality of these seal lips, and the tip edge of the intermediate seal lip outwardly located adjacent to this inner seal lip in the axial direction are arranged to come in sliding contact with the radially oriented peripheral surface of the other of the outer peripheral surface of the end portion of the inner race and the inner peripheral surface of the end portion of the outer race or the radially oriented peripheral surface of the member supported by the other peripheral surface.

Particularly, in said seal assembly, it is satisfied that $0.2 \cdot d1 \leq d2 \leq 0.8 \cdot d1$ at least at a location of the base end portion of the above inner seal lip wherein $d1$ is the thicknesses of the base end portion and $d2$ is the thickness of the tip end portion of the intermediate seal lip, and $D1$ is the thicknesses of the base end portion and $D2$ is the thicknesses of the tip end portion of the inner seal lip. Also, with the tip edge of the above inner seal lip being abutted against the radially oriented peripheral surface of the other of the outer peripheral surface of the end portion of the inner race and the inner peripheral surface of the end portion of the outer race or the radially oriented peripheral surface of the member supported by the other peripheral surface, the interference is nearly zero with no or very little elastic deformation of the above inner seal lip. Furthermore, preferably, all the above plurality of the seal lips are tilted in the direction such that it goes outwardly in the axial direction of the rolling bearing toward the respective tip edges thereof.

The seal assembly according to a second aspect is provided with a metal core, an annular member, a sealing member, an axially oriented seal lip and a radially oriented seal lip. The metal core among them is formed as a generally annular ring, and composed of a radially outer cylindrical portion which can be internally fitted and fixed to the inner peripheral surface of the end portion of the outer race and an inner circular ring portion which is bent inwardly in the radial direction from the axially inner end edge of this outer cylindrical portion. Also, the above annular member is formed as a generally annular ring, and composed of a radially inner cylindrical portion which can be externally fitted and fixed to the outer peripheral surface of the end portion of the inner race and an outer circular ring portion which is bent outwardly in the radial direction from the axially outer end edge of this inner cylindrical portion. Furthermore, the above sealing member is made of a resilient member whose portion is fixedly connected to at least one of the above metal core and annular member. Then, the above axially oriented seal lip is formed as part of the above sealing member with its tip edge slidably contacting the axially oriented side surface of a member which ratates relative to the metal core or the annular member to which this sealing member is fixed. Also, the above radially oriented seal lip is formed as part of the above sealing member with its tip edge slidably contacting the radially oriented peripheral surface of a member which ratates relative to the metal core or the annular member to which this sealing member is fixed.

Particularly, in said seal assembly, the base end portion of the above radially oriented seal lip has a thickness, at least in a location, smaller than that of the tip end portion. Also, it is satisfied that $0.010 \leq L1/R \leq 0.020$ and $0.008 \leq L2/R \leq 0.015$ wherein $L1$ is the diametrical interference, in the radial direction of the member having the radially oriented peripheral surface, between the tip edge of the above radially oriented seal lip and the radially oriented peripheral surface of the member which ratates relative to the metal core or the annular member to which this sealing member having the radially oriented seal lip is fixed, $L2$ is the interference, in the axial direction of the member having the axially oriented side surface, between the tip edge of the above axially oriented seal lip and the axially oriented side surface of the member which ratates relative to the metal core or the annular member to which this sealing member having the axially oriented seal lip is fixed, and $R$ is the diameter of the fitting portion between the outer peripheral surface of the inner race and the above inner cylindrical portion.

Also, the seal assembly in accordance with any of third to sixth aspects is provided with a support member, a sealing member and an axially oriented seal lip. The support member among them is fixed to one of the outer peripheral surface of the end portion of the inner race and the inner peripheral surface of the end portion of the outer race. On the other hand, the above sealing member is made of a resilient member whose portion is securely connected to the above support member. Also, the above axially oriented seal lip is formed as part of the above sealing member with its tip edge slidably contacting on the axially oriented side surface provided in the other of the outer peripheral surface of the end portion of the inner race and the inner peripheral surface of the end portion of the outer race or on the axially oriented side surface of the member supported by the other peripheral surface.

Particularly, in the seal assembly according to the third aspect, it is satisfied with $0.70 < t2/t1 < 0.85$ and $0.35 < t3/t1 < 0.65$ wherein, provided that a center point is defined as a position on the phantom line passing through the center in the thickness direction of the above axially oriented seal lip with the length from the tip end to the position being equal to the length from the base end to the position, $t1$ is the thickness of the above axially oriented seal lip at the base end, $t2$ at the center point and $t3$ at the tip end.

Also, in the seal assembly according to the fourth aspect, a projection is formed on the side surface of the tip end portion of the above axially oriented seal lip which is radially inwardly oriented in the free state thereof. The tip edge of this projection then comes in slidably contact with the axially oriented side surface provided in the other of the outer peripheral surface of the end portion of the inner race and the inner peripheral surface of the end portion of the outer race or with the axially oriented side surface of the member supported by the other peripheral surface.

Also, in the seal assembly according to the fifth aspect, the thickness of the above axially oriented seal lip is gradually decreasing, except for the tip end portion, from the base end portion to a position of the intermediate portion close to the tip end. In addition to this, the portion (the above tip end portion) from this position of the intermediate portion to the tip edge is gradually increased toward the tip edge. This tip edge then comes in slidably contact with the axially oriented side surface provided in the other of the outer peripheral surface of the end portion of the inner race and the inner peripheral surface of the end portion of the outer race or with the axially oriented side surface of the member supported by the other peripheral surface.

Also, in the seal assembly according to the sixth aspect, the tip edge portion of the above axially oriented seal lip is provided with an auxiliary seal lip projecting from the radially outer end thereof. Then, the tip edge of this auxiliary seal lip and the radially inner end of the tip edge of the above axially oriented seal lip separated from this auxiliary seal lip are arranged to come in slidably contact with the axially oriented side surface provided in the other of the outer peripheral surface of the end portion of the inner race and the inner peripheral surface of the end portion of the outer race or with the axially oriented side surface of the member supported by the other peripheral surface.

Also, the rolling bearing according to a seventh aspect is implemented with at least one of the seal assemblies described according to the first to sixth aspects.

Also, the hub unit according to an eighth aspect is a hub having an inner race for fixing a wheel and implemented with at least one of the seal assemblies described according to the first to sixth aspects.

In accordance with the seal assembly according to the present invention as described above and the rolling bearing and hub unit implemented therewith, the sealing performance can be improved.

First, in the case of the seal assembly according to the first aspect, while the thicknesses d2 and D2 of the base end portions of the intermediate and inner seal lips are designed small, the tip edge of this inner seal lip is fitted onto the peripheral surface of the mating member with substantially zero interference. Because of this, even when the inner race is tilted or decentered relative to the outer race so that the support member and the peripheral surface of the above mating member move close to each other, the tip edges of the above intermediate and inner seal lips can satisfactorily follow the movement of the peripheral surface of the above mating member to suppress the variation of the pressing force of the respective intermediate and inner seal lips. Accordingly, it is possible to obtain a good sealing performance by inhibiting the abrasion of these intermediate and inner seal lips, and inhibit the increase in the rotating torque of the rolling bearing.

Furthermore, in accordance with a preferred structure, all of a plurality of seal lips inclusive of the above inner seal lip are tilted outwardly in the axial direction of the above rolling bearing toward the tip edges thereof respectively, and therefore the grease applied inside of this rolling bearing can adequately be supplied to the slidably contacting region between the tip edges of the respective seal lips and the peripheral surface of the mating member. Accordingly, it is possible to maintain the lubrication condition of the respective slidably contacting regions, attain the lower rotating torque of the rolling bearing, and improve the sealing performance of the above respective slidably contacting regions. Furthermore, since the base end portions of all the seal lips are located apart from each other, the movement of each seal lip shall not interfere with the movement of the adjacent seal lip. Accordingly, since the tip edges of the above respective seal lips satisfactorily follow the movement of the peripheral surface of the mating member, it is possible to attain a more satisfactory sealing performance and limit the increase in the rotating torque of the rolling bearing.

Also, in the case of the seal assembly according to the second aspect, the sealing performance can be improved and therefore it is possible to prevent the grease applied inside of the rolling bearing from leaking out and prevent various types of matters objects such as rain water, mud, dust and the like from entering the inside of the rolling bearing. Furthermore, the rotating torque of the rolling bearing is prevented from excessively increasing.

Also, in the case of the seal assembly according to the third aspect, the strain generated in the axially oriented seal lip can be reduced, and therefore it is possible to maintain the pressing force of this axially oriented seal lip to the side surface of the mating member constant in the long term use. Because of this, the improved sealing performance can be maintained in the long term use. Also, even when the inner race is tilted relative to the outer race, the axially oriented seal lip can satisfactorily follow the movement of a slinger so that the sealing performance can be improved.

Also, in the case of the seal assembly according to the fourth aspect, when the sealing member and the mating member are relatively rotated, the axially oriented seal lip is prevented from being in surface-to-surface contact with the side surface of the mating member even if this mating member substantially moves toward this sealing member, so that the sealing performance is further improved.

Also, in the case of the seal assembly according to the fifth aspect, it is possible to prevent the sealing performance from being degraded due to the abrasion between the tip edge of the axially oriented seal lip and the side surface of the mating member to maintain the improved sealing performance in the long term use. Namely, it is considered as the cause of the degradation of the sealing performance that foreign matters enter the slidably contacting region between the tip edge of the axially oriented seal lip and the side surface of the mating member to cause the abrasion between the tip edge of the axially oriented seal lip and the side surface of the mating member and decrease the pressing force (interference) of the above axially oriented seal lip.

Also, in the case of the seal assembly according to the fourth aspect, the strain generated in the axially oriented seal lip can be reduced, and therefore it is possible to maintain the pressing force of this axially oriented seal lip constant in the long term use. Furthermore, in the case of the seal assembly according to the fifth aspect, even when foreign matters enter the slidably contacting region between the tip edge of the axially oriented seal lip and the side surface of the mating member to cause the abrasion between this tip edge of the axially oriented seal lip and the side surface of the mating member, it is possible to inhibit the decrease in the pressing force of the axially oriented seal lip by virtue of the thick tip end portion of this axially oriented seal lip.

Also, this axially oriented seal lip becomes gradually thinner from the base end portion to a position of the intermediate portion close to the tip end, and therefore it is possible to reduce the strain generated in the above axially oriented seal lip in its assembled state. In contrast to this, since this axially oriented seal lip is thicken at the tip end portion thereof, the axially oriented seal lip is hardly weakened even with the abrasion of the tip edge of this axially oriented seal lip, and therefore it is possible to maintain the pressing force constant furthermore in the long term use, as compared with the seal assembly according to the above fourth aspect. Also, even when the inner race is tilted relative to the outer race, the axially oriented seal lip can satisfactorily follow the movement of the side surface of the mating member so that the sealing performance can be satisfactorily maintained.

Furthermore, in the case of the seal assembly according to the sixth aspect, it is possible to prevent foreign matters from entering the slidably contacting region between the radially inner edge of the tip end portion in the axially oriented seal lip and the side surface of the mating member. Because of this, the abrasion of this slidably contacting region can be inhibited by preventing foreign matters from being bitten by this slidably-contacting region. Accordingly, in the case of this structure, the sealing performance can be improved. In addition to this, since the above auxiliary seal lip is formed in order to project from the tip edge of the above axially oriented seal lip, the cost does not substantially rise. Meanwhile, the above auxiliary seal lip sufficiently works as long as it prevents the entrance of foreign matters, and therefore the pressing force of this auxiliary seal lip need not be increased. Because of this, it is possible to make small or null the abrasion at the slidably contacting region between the tip edge of this auxiliary seal lip and the above side surface of the mating member. Also, even if there is some abrasion at this slidably contacting region, no influence thereof is exerted upon the sealing performance of the slidably contacting region between the side surface of the mating member and the radially inner end of the tip edge of the above axially oriented seal lip. Furthermore, since the pressing force of the above auxiliary seal lip can be significantly decreased, it is possible to prevent the pressing force of the above outer seal lip from excessively decreasing because of the provision of this auxiliary seal lip 19.

BEST MODE FOR CARRYING OUT THE INVENTION

Figure 1:
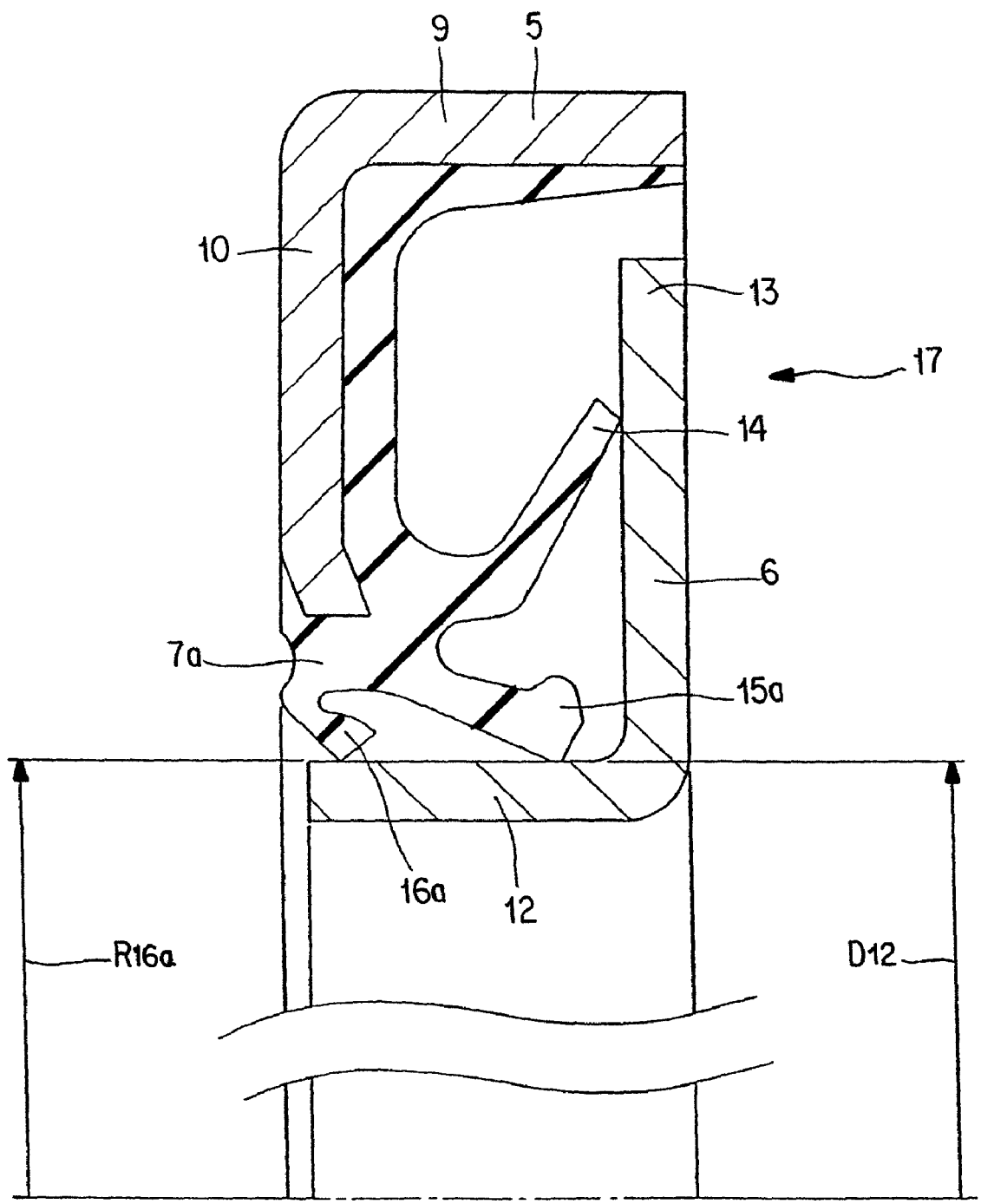
FIG. 1 is a partly cut away, cross sectional view of a first example of the embodiment of the present invention.
Figure 2:
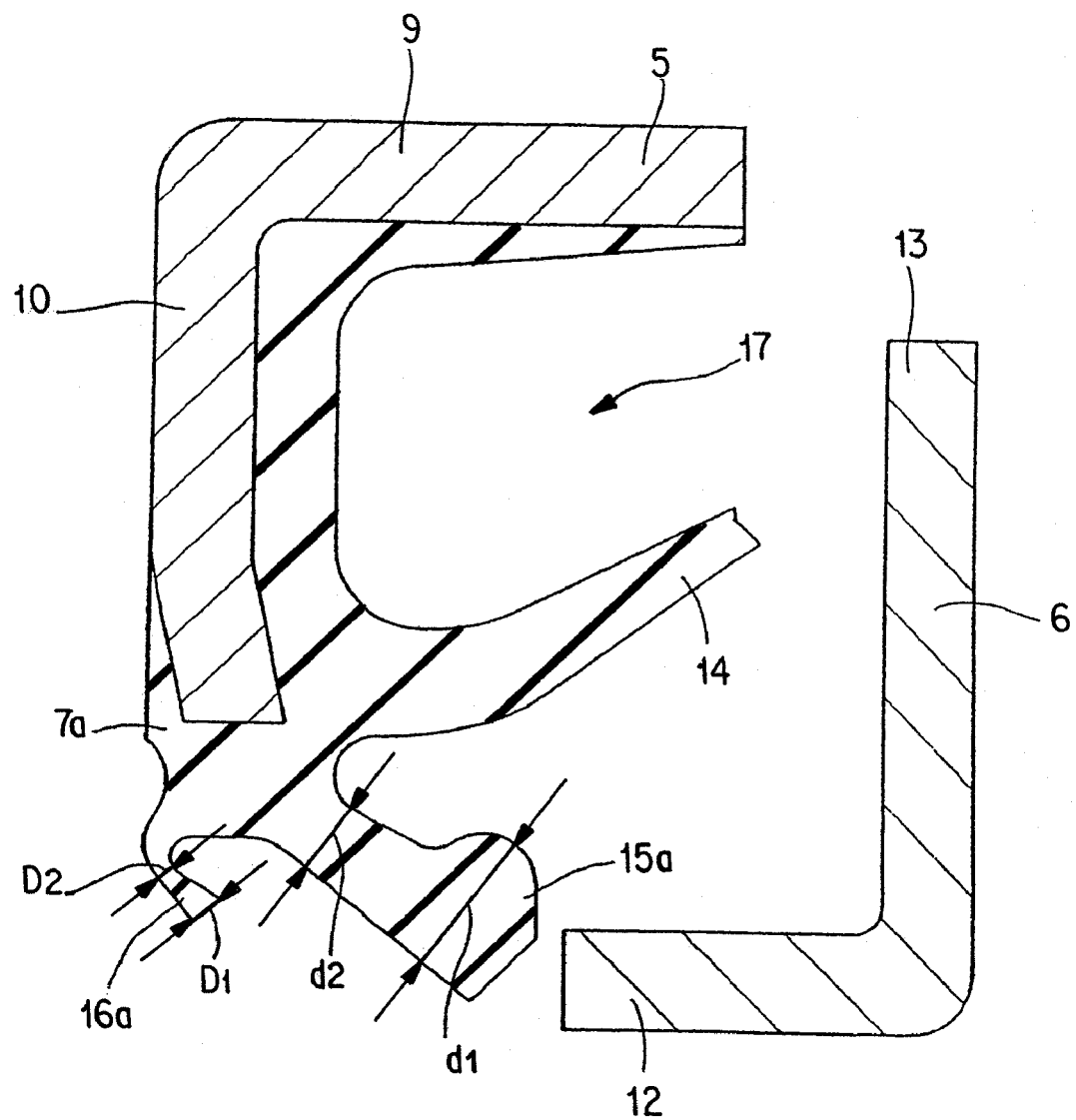
FIG. 2 is a partly cut away cross sectional view of the first example of FIG. 1 to show a seal member and metal core before they are combined with a slinger.

FIGS. 1 and 2 show a first example of the embodiment of the present invention corresponding to the first to seventh aspects. The seal assembly 17 according to the present invention is composed of a metal core 5, a slinger 6 and a sealing member 7*a*. The metal core 5 among these elements is formed in a single body by punching process, such as press work, and plastic-working process of a metallic plate such as a low-carbon steel plate. The metal core 5 is formed in a generally annular ring shape having an L-shaped cross section, and composed of a radially outer cylindrical portion 9 which can be internally fitted and fixed to the inner peripheral surface of the end portion of the outer race 8 (see FIG. 25) of the rolling bearing and an inner circular ring portion 10 which is bent inwardly in the radial direction from the end edge at the axially inner end of this radially outer cylindrical portion 9 (the left edge as illustrated in FIGS. 1 and 2).

The above slinger 6 is also integrally formed in a single body by punching process, such as press work, and plastic-working process of a metallic plate having an excellent corrosion resistance such as a stainless steel plate. The slinger 6 is formed in a generally annular ring shape having an L-shaped cross section, and composed of, as the components of the above rolling bearing, a radially inner cylindrical portion 12 which can be externally fitted and fixed to the outer peripheral surface of the end portion of an inner race 11 (see FIG. 25) of the rolling bearing and an outer circular ring portion 13 which is bent outwardly in the radial direction from the edge at the axially outer end of this radially inner cylindrical portion 12 (the right edge as illustrated in FIGS. 1 and 2). Meanwhile, FIG. 2 illustrates the seal assembly 17 before the slinger 6 is engaged with the metal core 5 and the sealing member 7a.

Also, the above sealing member 7a is made of a resilient member, for example, an elastomer such as a rubber, and provided with three seal lips 14, 15a and 16a, i.e., an outer, an intermediate and an inner seal lip, whose base end portion is fixedly connected to the above metal core 5. The outer seal lip 14, which is provided in the outermost location, has the tip edge to be in slidable contact with the inner surface of the outer circular ring portion 13. On the other hand, the intermediate seal lip 15a and the inner seal lip 16a, which are the remaining two seal lips, have tip edges to be in slidable contact with the outer peripheral surface of the inner cylindrical portion 12 of the above slinger 6. Then, in the case of the present invention, at least a location of the base end portion of the above intermediate seal lip 15a (the most thin location) is designed to have a thickness d2 satisfying $0.2 \cdot d1 \leq d2 \leq 0.8 \cdot d1$, where d1 is the thickness of a location of the tip end portion of the intermediate seal lip 15a (the most thick location). For example, the thickness d2 of the location of the above base end portion is about 0.5 times the thickness d1 of the location of the above tip end portion ($d2 \approx 0.5 \cdot d1$) within the above predetermined range.

Furthermore, in the case of the present invention, at least a location of the base end portion of the above inner seal lip 16a (the most thin location) is designed to have a thickness D2 satisfying $0.5 \cdot D1 \leq D2 < D1$, where D1 is the thickness of a location of the tip end portion of the inner seal lip 16a (the most thick location). For example, the thickness D2 of the location of the above base end portion is about 0.6 times the thickness D1 of the location of the above tip end portion ($D2 \approx 0.6 D1$) within the above predetermined range.

Furthermore, in the case of this example, the above three seal lips 14, 15a and 16a are tilted outwardly in the axial direction of the above rolling bearing toward the tip edges thereof respectively. Then, with the tip edge of the inner seal lip 16a most inwardly located being abutted against the outer peripheral surface of the radially inner cylindrical portion 12 constituting the above slinger 6, the interference is nearly zero with no or very little elastic deformation of the above inner seal lip 16a. For this reason, the inner diameter of the above inner seal lip 16a in its free state is designed to be almost the same in size as the outer diameter of the above inner cylindrical portion 12. For example, in the case of the rolling bearing for supporting the wheels of an automobile, the outer diameter D12 of the radially inner cylindrical portion 12 is about 40 mm to 70 mm, and in this case, the inner diameter R16a of the above inner seal lip 16a in its free state is regulated to be no smaller than the above outer diameter D12 minus 0.5 mm and no larger than this outer diameter D12 plus 0.2 mm, that is $\{(D12-0.5 \text{ mm}) \leq R16a \leq (D12+0.2 \text{ mm})\}$.

In the case of the seal assembly according to the present invention as described above and the rolling bearing implemented therewith, the thicknesses d2 and D2 at the base end of the intermediate seal lip 15a and the inner seal lip 16a are designed to be small, and the tip edge of this inner seal lip 16a is externally fitted onto the outer peripheral surface of the radially inner cylindrical portion 12 constituting the slinger 6 with almost zero interference. Accordingly, even if the inner race 11 is tilted or decentered relative to the outer race 8 so that the slinger 6 and the metal core 9 move close to each other, the tip edges of the respective intermediate and inner seal lips 15a and 16a well follow the movement of the surface of the above slinger 6 to limit the variation of the pressing force of the respective intermediate and inner seal lips 15a and 16a. Accordingly, it is possible to obtain a good sealing performance by inhibiting the abrasion of these intermediate and inner seal lips 15a and 16a, and inhibit the increase in the rotating torque of the rolling bearing.

Furthermore, in the case of this example, all the three seal lips 14, 15a and 16a inclusive of the above inner seal lip 16a are tilted outwardly in the axial direction of the above rolling bearing toward the tip edges thereof respectively, and therefore the grease applied inside of this rolling bearing can adequately be supplied to the slidably contacting region between the slinger 6 and the tip edges of the respective seal lips 14, 15a and 16a. Accordingly, it is possible to maintain the lubrication condition of the respective slidably contacting regions, attain the lower rotating torque of the rolling bearing, and improve the sealing performance of the above respective slidably contacting regions by closing the respective slidably contacting regions with a grease. Furthermore, since the base end portions of all the seal lips 14, 15a and 16a are located apart from each other, the movement of each seal lip shall not interfere with the movement of an adjacent seal lip. Accordingly, since the tip edges of the above respective the seal lips 14, 15a and 16a satisfactorily follow the movement of the surface of the above slinger 6, it is possible to attain a more satisfactory sealing performance and limit the increase in the rotating torque of the rolling bearing.

Figure 3:
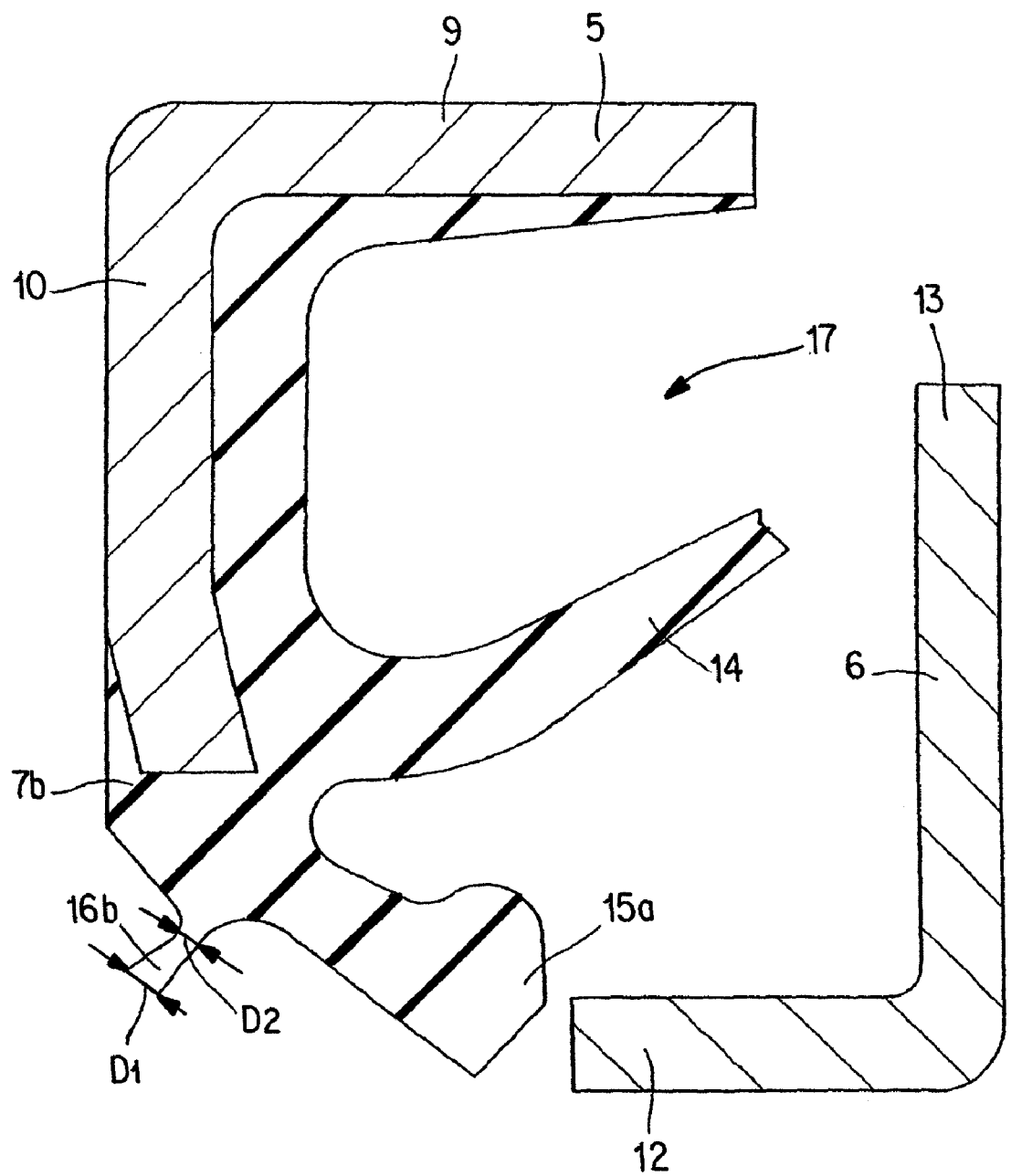
FIG. 3 is a partly cut away, cross sectional view of a second example of the embodiment of the present invention, similar to FIG. 2.

Next, FIG. 3 shows a second example of the embodiment of the present invention corresponding to the first to seventh aspects. In the case of this example, differing from the first example as described above, an inner seal lip 16b, which is located in the innermost position among these three seal lips 14, 15a and 16b constituting a sealing member 7b, is tilted in the direction to the center of the rolling bearing in the axial direction toward the tip edge thereof. Then, with the tip edge of the inner seal lip 16b being abutted against the outer peripheral surface of the radially inner cylindrical portion 12 constituting the above slinger 6, the interference is nearly zero with no or very little elastic deformation of the above inner seal lip 16b. Also in the case of the present invention, in the same manner as the above first example, at least a location of the base end portion of the above inner seal lip 16b (the most thin tip edge portion) is designed to have a thickness D2 satisfying $0.5 \cdot D1 \leq D2 < D1$, where D1 is the thickness of a location of the tip end portion of the inner seal lip 16b (the most thick location).

In the case of this example, however, differing from the first example, the inner seal lip 16b is tilted in the direction to the center of the rolling bearing in the axial direction toward the tip edge thereof. Because of this, the grease applied inside of this rolling bearing tends relatively not to be supplied to the slidably contacting region between the slinger 6 and the tip edges of the respective outer and intermediate seal lips 14 and 15a, and therefore there is the possibility of decreasing the sealing performance and increasing the rotating torque of the rolling bearing as compared to the case of the first example. However, even in the case of this example, when the inner race 11 is tilted or decentered relative to the outer race 8 (see FIG. 25) so that the slinger 6 and the metal core 9 move close to each other, the tip edges of the respective intermediate and inner seal lips 15a and 16b can satisfactorily follow the movement of the surface of the above slinger 6 to limit the variation of the pressing force of the respective intermediate and inner seal lips 15a and 16b. Accordingly, although being inferior to the performance of the first example, it is also possible to attain a satisfactory sealing performance and limit the increase in the rotating torque of the rolling bearing by inhibiting the abrasion of the respective intermediate and inner seal lips 15a and 16b.

The structures and the functionality of the other members are similar to those of the first example as described above, and therefore redundant explanation is not repeated while like reference numbers indicate functionally similar elements.

Figure 4:
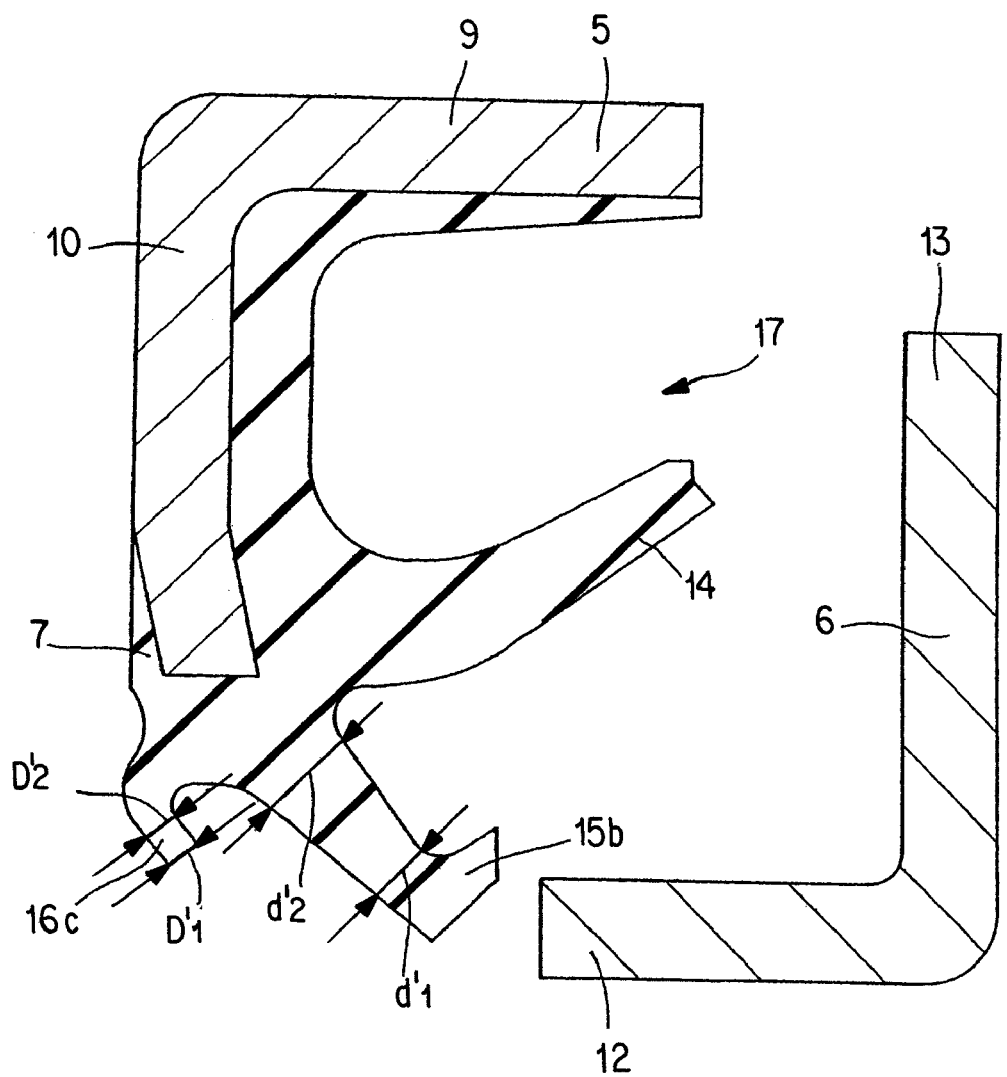
FIG. 4 is an example of the conventional structure used for comparison, similar to FIG. 2.

Next, the result of a first simulation conducted by the inventors of the present invention for confirming the advantages of this example will be explained This first simulation was conducted to investigate the influence of the thickness of the base end portions of the intermediate seal lip and the inner seal lip upon the pressing forces of the respective seal lips by the use of the conventional structure as illustrated in FIG. 4 and the structure according to the present invention illustrated in FIGS. 1 to 2 as described above.

Meanwhile, in the conventional structure as illustrated in FIG. 4, the ratio d2'/d1' of the thickness d2' of the location of the base end portion of the intermediate seal lip 15b (the most thick location) to the thickness d1' of the location of the tip end portion of the intermediate seal lip 15b (the most thin location) was 1.5, and the ratio D2'/D1' of the thickness D2' of the location of the base end portion of the inner seal lip 16c (the most thick location) to the thickness D1' of the location of the tip end portion of the inner seal lip 16c (the most thin location) was 1.2. In contrast to this, in the case of the structure according to the present invention illustrated in FIGS. 1 to 2 as described above, the ratio d2/d1 of the thickness d2 of the location of the base end portion of the intermediate seal lip 15a (the most thin location) to the thickness d1 of the location of the tip end portion of the intermediate seal lip 15a (the most thick location) was 0.5, and the ratio D2/D1 of the thickness D2 of the location of the base end portion of the inner seal lip 16a (the most thin location) to the thickness D1 of the location of the tip end portion of the inner seal lip 16a (the most thick location) was 0.6. Then, with the slinger 6 being tilted relative to the metal core 5 at a predetermined angle in the above conventional structure and the structure according to the present invention, the finite element method was applied for obtaining the distribution of the pressing force of the intermediate seal lips 15a and 15b and the inner seal lips 16a and 16c in the circumferential direction of the respective slidably contacting regions.

Figure 5:
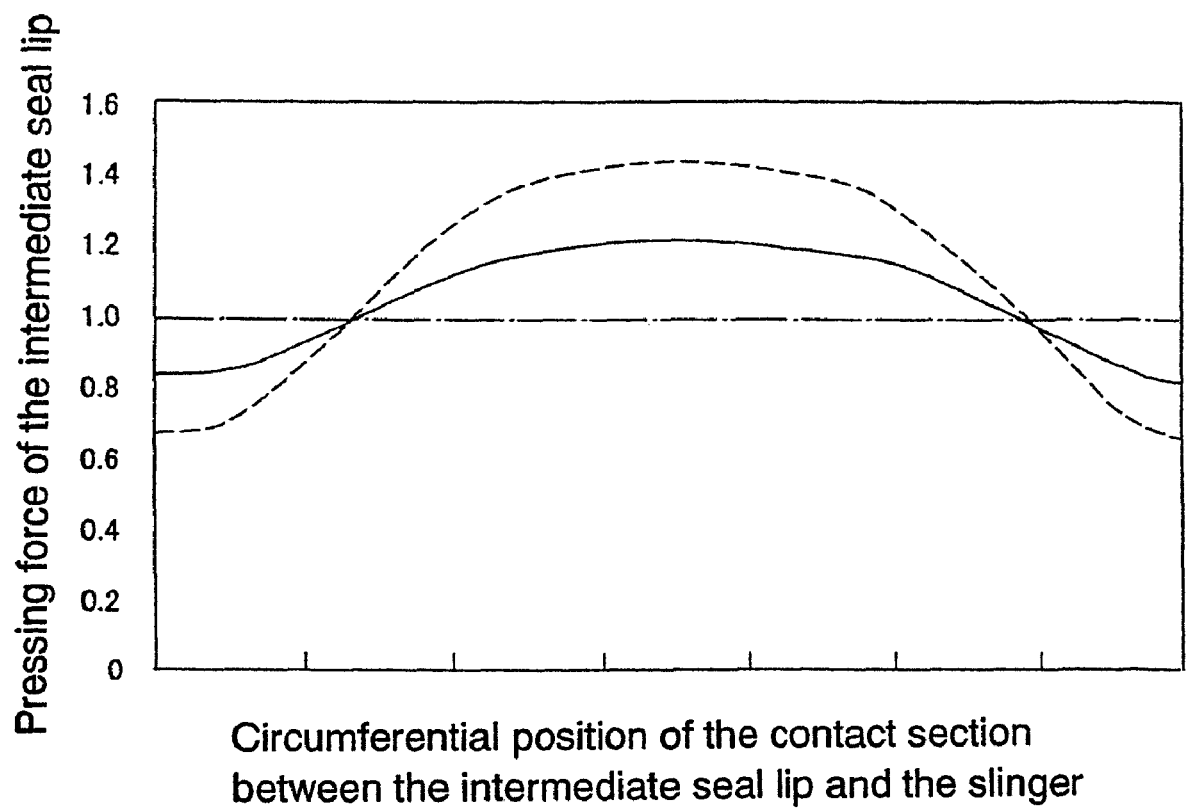
FIG. 5 is a view to show a distribution in the circumferential direction of the pressing force of the intermediate seal lip.

First, FIG. 5 shows the result of simulation conducted by the inventors with the intermediate seal lips 15a and 15b. Meanwhile, in FIG. 5, the abscissa shows the location in the circumferential direction of the slidably contacting region between the peripheral surface of the slinger 6 and the tip edges of the intermediate seal lips 15a and 15b, and the ordinate shows the pressing forces of the above intermediate seal lips 15a and 15b. Also, the numerical values of this ordinate are values relative to the average value of the pressing force of the intermediate seal lip 15b of the conventional structure with the slinger 6 being not tilted relative to the metal core 5. Also, in the same figure, the pressing forces of the intermediate seal lips 15a and 15b with the slinger 6 being tilted relative to the metal core 5 at the above predetermined angle are plotted respectively by a solid line according to the present invention and by a broken line according to the conventional structure. Incidentally, the one-dot chained line shows the pressing force with the slinger 6 being not tilted relative to the metal core 5 according to the conventional structure.

As apparent from the result of simulation as illustrated in FIG. 5, when the slinger 6 was tilted relative to the metal core 5 in the conventional structure, the pressing force varied in the range of about 0.6 to about 1.4 in the circumferential direction of the slidably contacting region. In contrast to this, in the case of the structure according to the present invention, the above pressing force varied in the range of about 0.8 to about 1.2. As apparent from the results, in accordance with the present invention, even when the slinger 6 is tilted relative to the metal core 5, it is possible to reduce the difference between the maximum value and the minimum value of the pressing force of the intermediate seal lip 15a.

Figure 6:
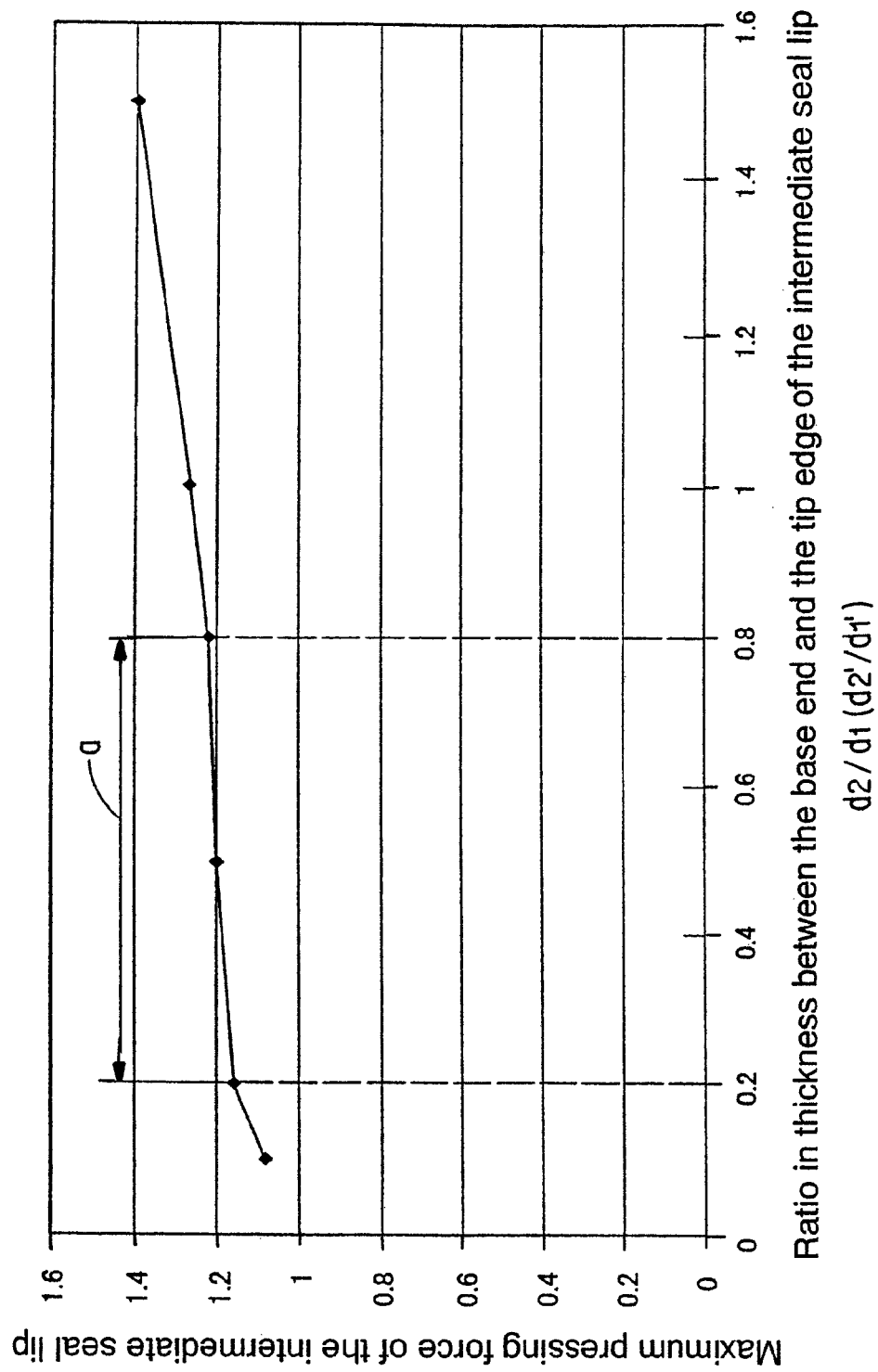
FIG. 6 is a diagram to show a relationship between the ratio in thickness of the parts of the intermediate seal lip, and the maximum value of the pressing force of the intermediate seal lip.

Also, FIG. 6 shows the result of obtaining the relationship between the maximum value of the pressing force and the thickness of the base end portion of the intermediate seal lip 15a or 15b. In the same figure, the abscissa shows the ratio d2/d1 (d2'/d1') between the thickness d2 (d2') of the base end portion and the thickness d1 (d1') of the tip end portion of the intermediate seal lips 15a and 15b, and the ordinate shows the maximum value of the pressing force the intermediate seal lips 15a and 15b. Also, the arrow "a" indicates the range of the above ratio d2/d1 (d2'/d1') in accordance with the first aspect of the present invention.

As apparent from the result of simulation as illustrated in FIG. 6, if the above ratio d2/d1 (d2'/d1') exceeds 0.8, which is the upper limit of the range according to the present invention, the maximum value of the above pressing force quickly increases. This results not only in excessively increasing the rotating torque of the rolling bearing but also in increasing the strain of the sealing member, whose operating life is thereby shortened. In contrast to this, in the case where the above ratio d2/d1 (d2'/d1') falls within 0.8, which is the upper limit of the range according to the present invention, the maximum value of the above pressing force can be maintained low. However, if the above ratio d2/d1 (d2'/d1') falls below 0.2, which is the lower limit of the range according to the present invention, the above pressing force becomes too small and therefore the sealing performance of the rolling bearing is degraded. For this reason, various types of foreign matters such as rain water, mud, dust and the like tend to enter the inside of the rolling bearing. Namely, if the above ratio d2/d1 (d2'/d1') falls below 0.2, the thickness of the base end portion of the intermediate seal lip becomes too small to obtain a necessary sealing performance even by increasing in some degree the contact area between the tip end portion of this intermediate seal lip and the outer peripheral surface of the slinger.

Figure 7:
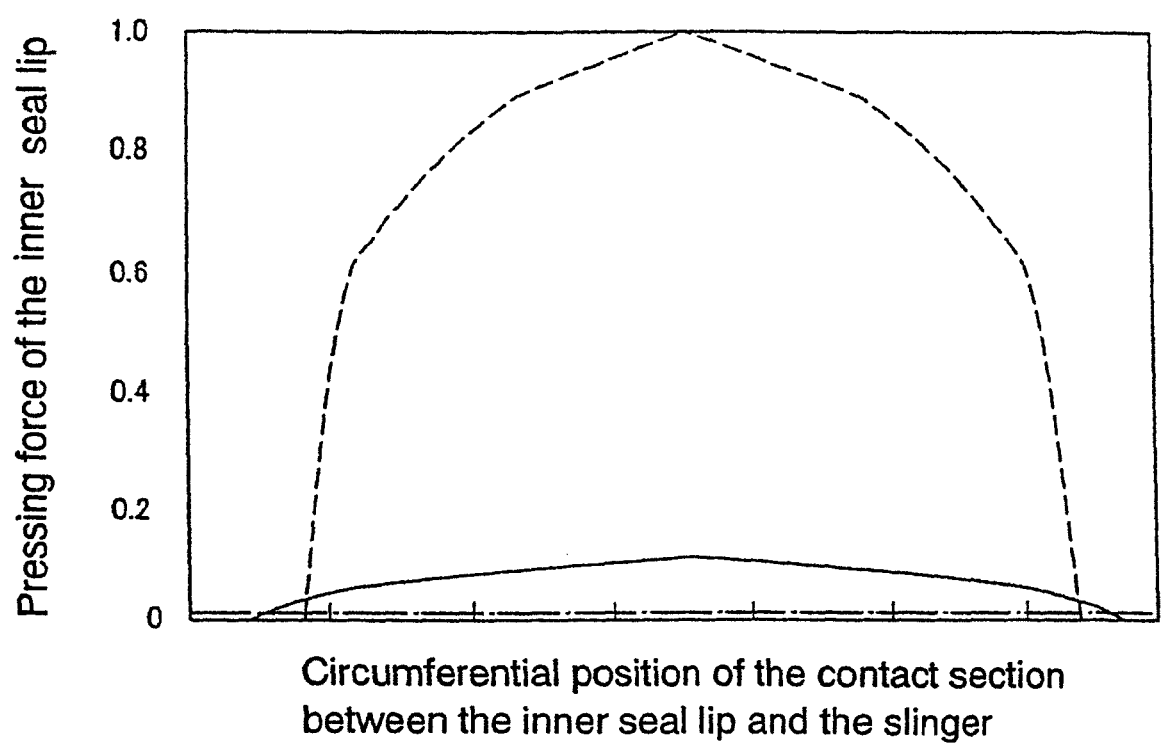
FIG. 7 is a graph to show a distribution in the circumferential direction of the pressing force of the inner seal lip.

Next, FIG. 7 shows the result of simulation for obtaining the circumferential distribution of the pressing force of the inner seal lips 16a and 16c. The relationship between the ordinate and the abscissa in this FIG. 7 is the same as that of the intermediate seal lips 15a and 15b illustrated in FIG. 5. In this case, the pressing forces of the above inner seal lips 16a and 16c with the slinger 6 being tilted relative to the metal core 5 at the predetermined angle are plotted respectively by a solid line according to the present invention and by a broken line according to the conventional structure. Incidentally, the one-dot chained line shows the pressing force with the slinger 6 being not tilted relative to the metal core 5 in the structure according to the present invention. As apparent from FIG. 7, in accordance with the present invention, since the tip edge of the inner seal lip 16a comes in contact with the outer peripheral surface of the slinger 6 with approximately zero interference, the pressing force of the above inner seal lip 16a becomes approximately zero with the slinger 6 being not tilted relative to the metal core 5. Also, when the slinger 6 is tilted relative to the metal core 5 at a predetermined angle, if the maximum value of the pressing force of the inner seal lip 16c is 1 in the case of the above conventional structure, the maximum value of the pressing force of the inner seal lip 16a becomes significantly small as about 0.1 in the structure according to the present invention.

Figure 8:
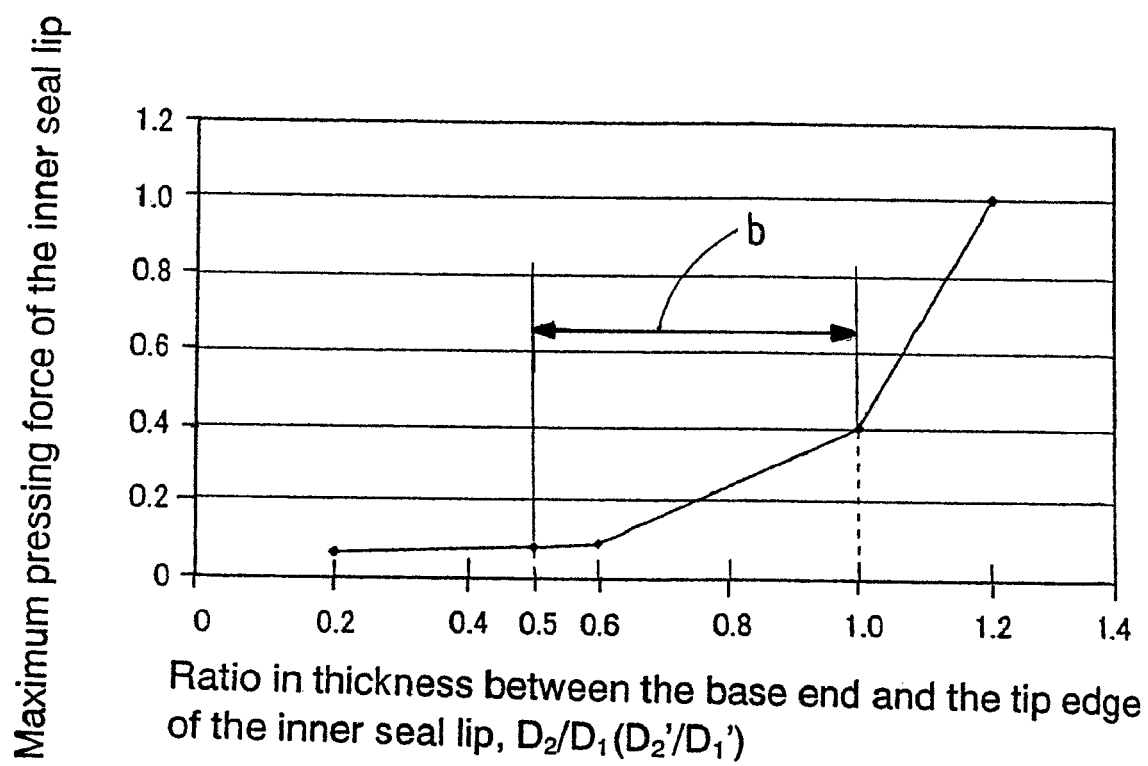
FIG. 8 is a graph to show a relationship between the ratio in thickness of the parts of the inner seal lip, and the maximum value of the pressing force of the inner seal lip.

Also, FIG. 8 shows the result of obtaining the relationship between the thickness of the base end portion of the inner seal lip 16a or 16c and the maximum value of the pressing force.

In the same figure, the relationship between the abscissa and the ordinate is the same as illustrated in FIG. 6. Also, the arrow "b" indicates the range of the ratio D2/D1 (D2'/D1') between the thickness D2 (D2') of the base end portion and the thickness D1 (D1') of the tip end portion of the inner seal lips 16a and 16c in accordance with the first aspect of the present invention. As apparent from the result as illustrated in FIG. 8, if the above ratio D2/D1 (D2'/D1') is no smaller than 1.0, which is the upper limit of the range according to the present invention, the maximum value of the above pressing force quickly increases. This results not only in excessively increasing the rotating torque of the rolling bearing but also in increasing the strain of the sealing member, whose operating life is thereby shortened. In accordance with the experiment conducted by the inventors of the present invention, when the above ratio D2/D1 (D2'/D1') was at least 1.0, the abrasion of the inner seal lip becomes significant to shorten the life thereof. In contrast to this, in the case where the above ratio D2/D1 (D2'/D1') is smaller than 1.0, which is the upper limit of the range according to the present invention, the maximum value of the above pressing force can be maintained low. However, if the above ratio D2/D1 (D2'/D1') is smaller than 0.5, which is the lower limit of the range according to the present invention, the thickness of the above inner seal lips 16a and 16c becomes excessively small to significantly decrease the strength.

From the result of the simulation and the experiments, it was confirmed that the advantages as described above can be obtained in accordance with the present example. Also, it was confirmed that the strength of the inner seal lips 16a and 16b can be secured in accordance with the present example.

Figure 9:
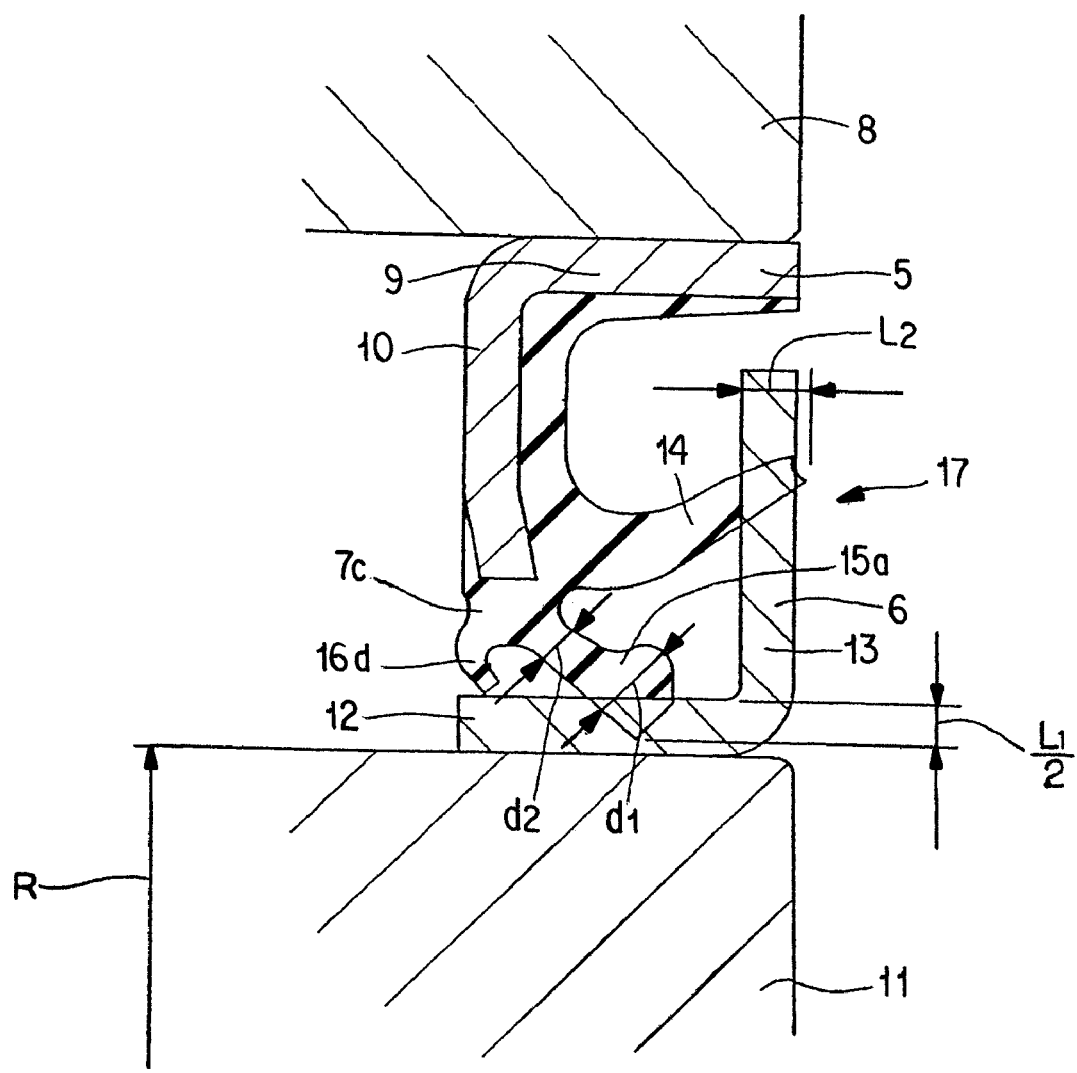
FIG. 9 is a partly cut away, cross sectional view of a third example of the embodiment of the present invention.

Next, FIG. 9 shows a third example of the embodiment of the present invention corresponding to the second and seventh aspects. Meanwhile, in FIG. 9, the slinger 6 as an annular member and the sealing member 7c are illustrated in the respective free states, partially overlapping each other, and the illustration does not correspond to an actual assembled condition. In the case of this example, among these three seal lips 14a, 15a and 16d constituting the above sealing member 7c, i.e., an outer, an intermediate and an inner seal lip, the outer seal lip 14, which is located in the outermost position is tilted outwardly in the radial direction of the rolling bearing toward the tip edge thereof. Also, the intermediate seal lip 15a located in the intermediate position and the inner seal lip 16d located in the innermost position are tilted outwardly in the axial direction of the above rolling bearing toward the tip edges thereof respectively. Also, in the case of this example, this inner seal lip 16d has the nearly same thickness throughout the entire length from the base end portion to the tip edge. Incidentally, in the case of this example, the above outer seal lip 14 corresponds to the axially oriented seal lip of the second aspect, and the above inner seal lip 16d corresponds to the radially oriented seal lip of the second aspect.

Then, in the case of this example, the thickness d2 of the base end portion of the above intermediate seal lip 15a is smaller than the thickness d1 of the tip end portion of this intermediate seal lip 15a (d2<d1). Also, the interference between the intermediate seal lip 15a and the slinger 6 as well as the interference between the outer seal lip 14 and the slinger 6 are controlled within the respective predetermined range. That is, in the case of this example, the diametrical interference between the tip edge of the above intermediate seal lip 15a and the outer peripheral surface of the radially inner cylindrical portion 12 constituting the slinger 6 is designed to be L1 in the radial direction of this radially inner cylindrical portion 12. Also, the interference between the tip edge of the above intermediate seal lip 14 and inner surface of the outer circular ring portion 13 constituting the slinger 6 is designed to be L2 in the axial direction of this outer circular ring portion 13. Furthermore, the diameter of the fitting portion between the outer peripheral surface of the inner race 11 and the inner peripheral surface of the radially inner cylindrical portion 12 is designed to be R. Then, in this case, the respective dimensions are determined in order that $0.010 \leqq L1/R \leqq 0.020$ and $0.008 \leqq L2/R \leqq 0.015$.

In the case of the seal assembly according to the present example as described above and the rolling bearing implemented therewith, the sealing performance can be improved by suitably controlling the interference of the respective outer and intermediate seal lips 14 and 15a. Because of this, it is possible to prevent the grease applied inside of the rolling bearing from leaking out and various types of foreign matters such as rain water, mud, dust and the like from entering the inside of the rolling bearing. Furthermore, the rotating torque of the rolling bearing is prevented from excessively increasing.

The structures and the functionality of the other members are similar to those of the first example as illustrated in FIGS. 1 and 2. Also, this example can be practiced in combination with the first example as described above. Meanwhile, although not shown in the figure, it will be appreciated in the case of the second example that the inner seal lip may be tilted in the direction to the axial center of the rolling bearing toward the tip edge thereof.

Figure 10:
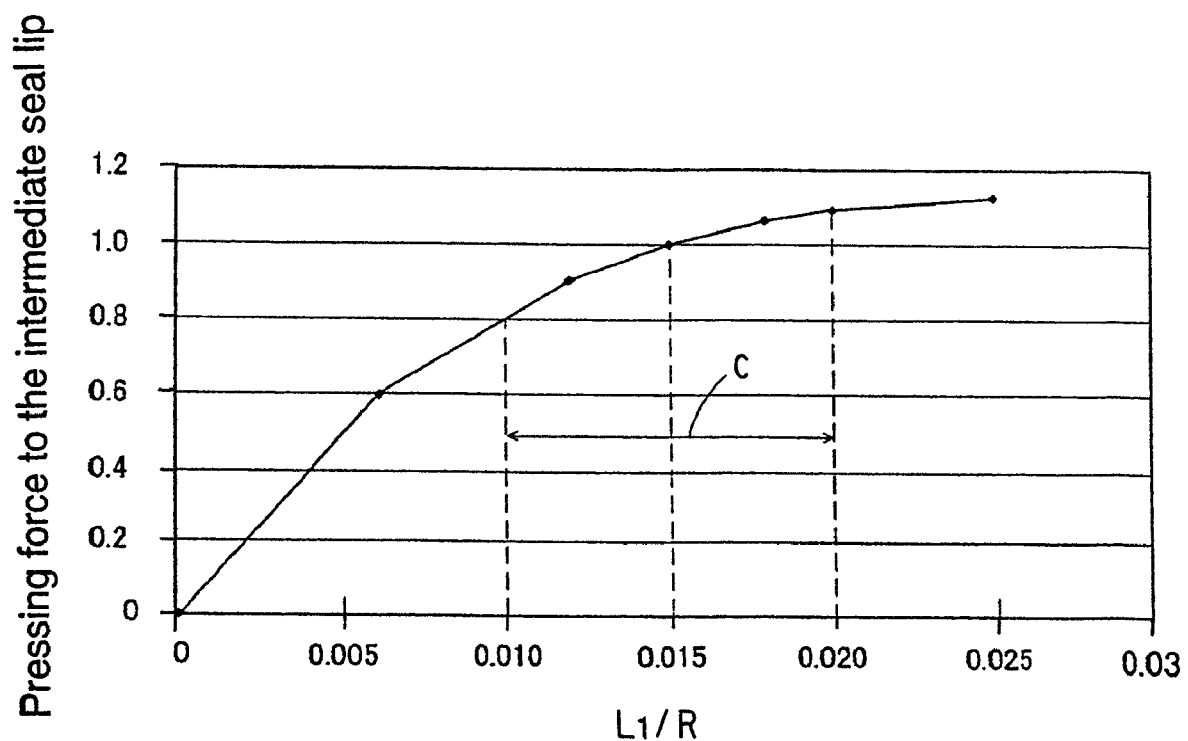
FIG. 10 is a graph to show a relationship between the ratio of interference to diameter, and the pressing force with respect to the intermediate seal lip.

Next, the result of a second simulation conducted by the inventors of the present invention for confirming the advantages of this example will be explained In this second simulation, first, the pressing force of the intermediate seal lip 15a of the above structure of the third example as illustrated in FIG. 9 was obtained with varying values of the ratio L1/R of the diametrical interference L1 between the tip edge of the intermediate seal lip 15a and the outer peripheral surface of the radially inner cylindrical portion 12 to the diameter R of the fitting portion between the outer peripheral surface of the inner race 11 and the inner peripheral surface of the radially inner cylindrical portion 12. The result of simulation as conducted in this manner is shown in FIG. 10. Meanwhile, in FIG. 10, the abscissa and the ordinate show the above ratio L1/R and the pressing force of the intermediate seal lip 15a respectively. Also, the numerical values of this ordinate are values relative to, as a reference value, the pressing force when the above ratio L1/R was 0.015. Also, the arrow "c" indicates the range of the above ratio L1/R in accordance with the second aspect of the present invention. As apparent from the result of simulation as illustrated in FIG. 10, if the above ratio L1/R is smaller than 0.010, the pressing force of the intermediate seal lip 15a quickly decreases. In contrast to this, if the above ratio L1/R is 0.010 or larger, the pressing force of the intermediate seal lip 15a can be sufficiently secured, that is 0.8 or larger. Also, in accordance with the durability test conducted by the inventors of the present invention, with the above ratio L1/R being smaller than 0.010, the pressing force excessively decreased to shorten the life of the seal, and therefore water easily entered the inner space of the rolling bearing. On the other hand, when the above ratio L1/R exceeds 0.020, the maximum strain of the sealing member 7c increases to 15%, and in addition to this, the pressing force becomes excessively large to increase the abrasion between the intermediate seal lip 15a and the slinger 6 and, to shorten the life of the seal than lengthening it.

Figure 11:
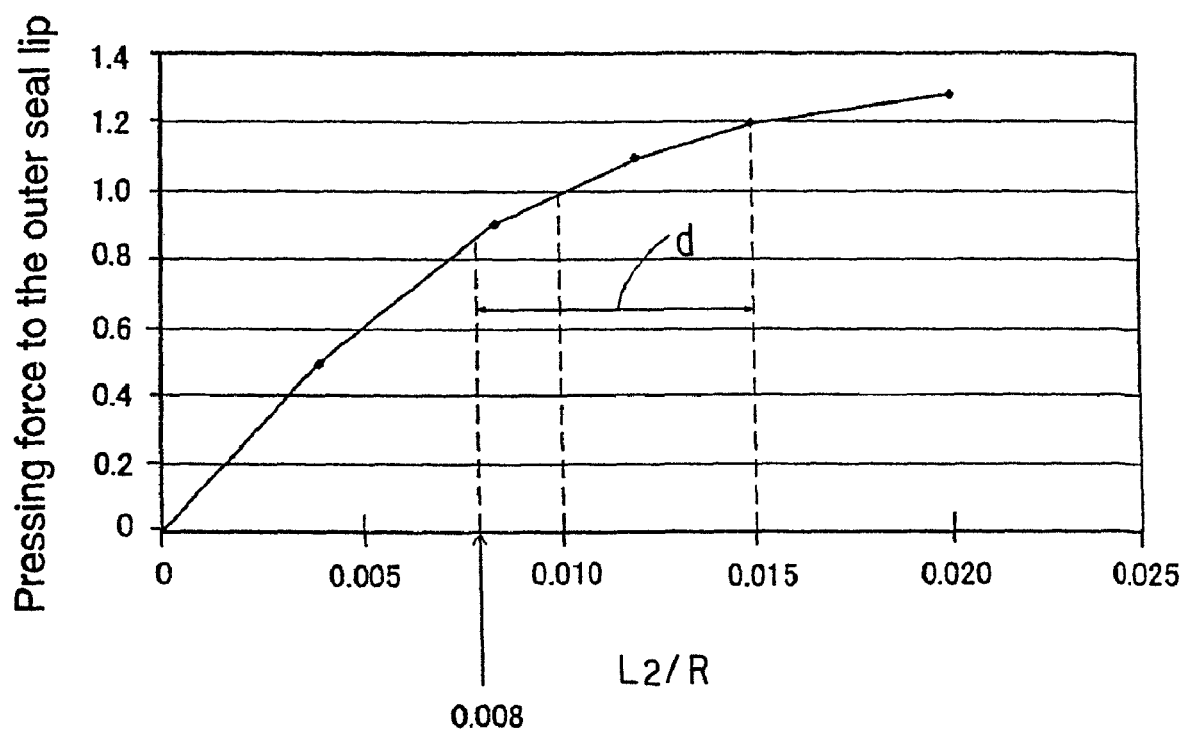
FIG. 11 is a graph to show a relationship between the ratio of interference to diameter, and the pressing force with respect to the outer seal lip.

Also, in the above simulation, the finite element method was applied for obtaining the pressing force of the outer seal lip 14 of the above structure of the third example as described above with varying values of the ratio L2/R of the interference L2 between the tip edge of the outer seal lip 14 and the inner surface of the radially outer circular ring portion 13 to the diameter R of the above fitting portion. The result of simulation as conducted in this manner is shown in FIG. 11. Meanwhile, in FIG. 11, the abscissa and the ordinate show the above ratio L2/R and the pressing force of the above outer seal lip 14 respectively. Also, the numerical values of this ordinate are values relative to, as a reference value, the pressing force when the above ratio L2/R was 0.010. Also, the arrow "d" indicates the range of the above ratio L2/R in accordance with the second aspect of the present invention. As apparent from the result of simulation as illustrated in FIG. 11, if the above ratio L2/R is smaller than 0.008, the pressing force of the outer seal lip 14 quickly decreases. In contrast to this, if the above ratio L2/R is at least 0.008, the pressing force of the above outer seal lip 14 can be sufficiently secured to be 0.9 or larger. Also, in accordance with the durability test conducted by the inventors of the present invention, the pressing force excessively decreased with the above ratio L2/R being smaller than 0.008 to shorten the life of the seal, and therefore water easily entered the inner space of the rolling bearing. On the other hand, when the above ratio L2/R exceeds 0.015, the maximum strain of the sealing member 7c increases to 15%, and in addition to this, the pressing force becomes excessively large to increase the abrasion between the outer seal lip 14 and the slinger 6 and to shorten the life of the seal than lengthening it. From the results of the simulation and the durability test as described above, the advantages of this example have been confirmed.

Figure 12:
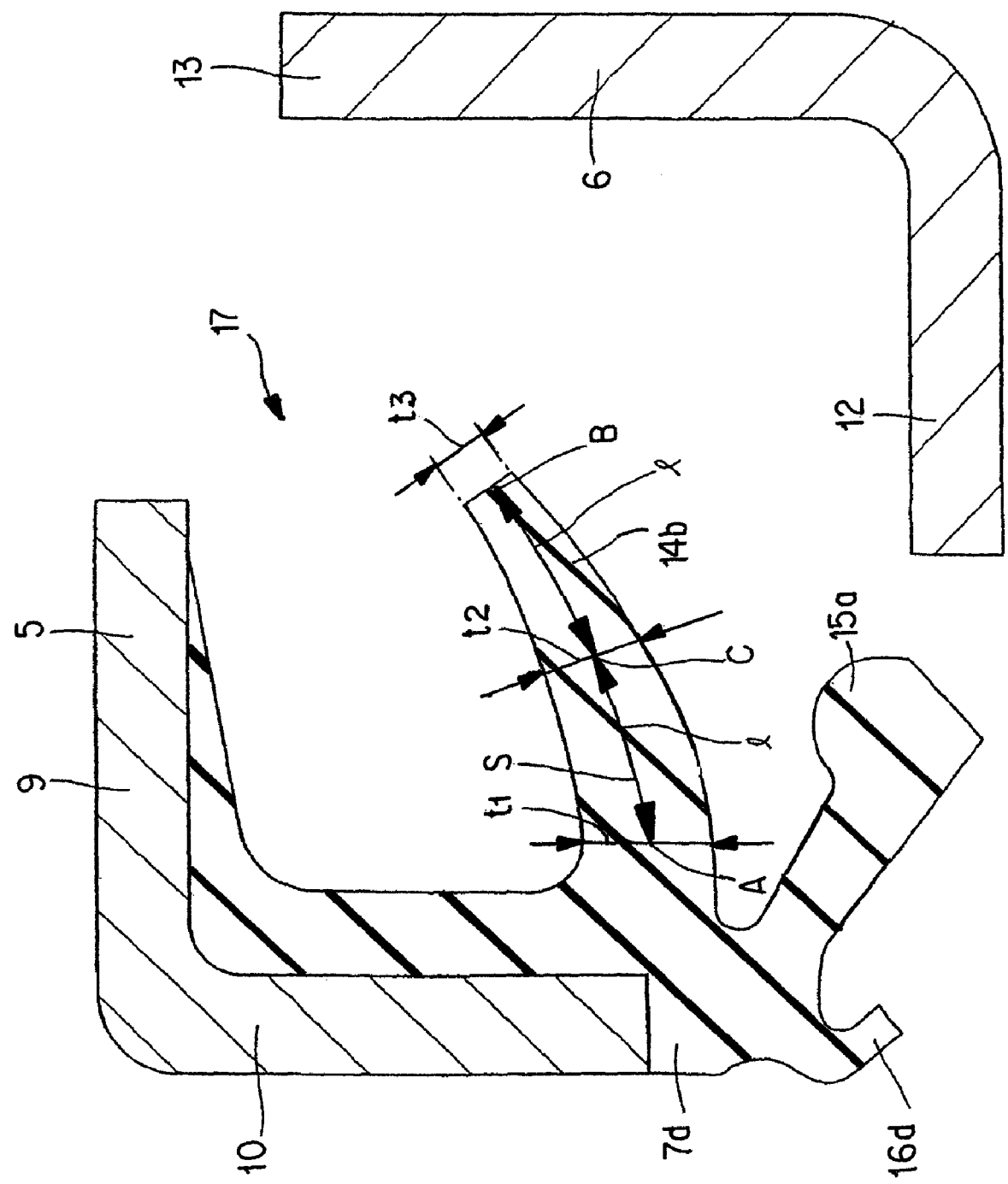
FIG. 12 is a partly cut away, cross sectional view of a fourth example of the embodiment of the present invention, similar to FIG. 2.
Figure 13:
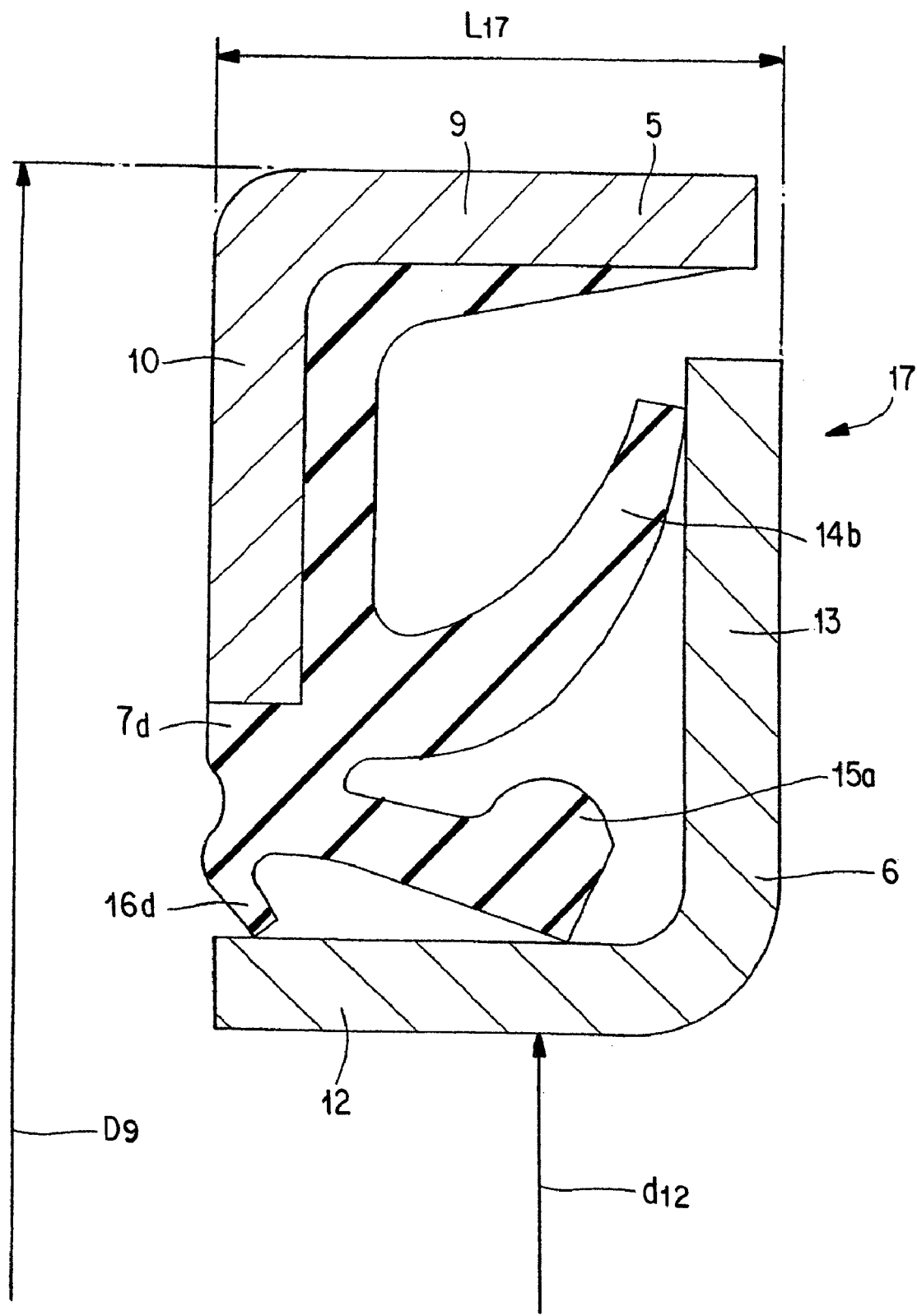
FIG. 13 is a cross sectional view of part of the assembled structure of the fourth example.

Next, FIGS. 12 and 13 show a fourth example of the embodiment of the present invention corresponding to the third and seventh aspects. In the case of this example, an inner seal lip 16d, which is located in the innermost position among these three seal lips 14b, 15a and 16d constituting a sealing member 7d, is designed to have the nearly uniform thickness throughout the entire length from the base end portion to the tip edge. Particularly, in the case of this example, the outer seal lip 14b, which is located in the outermost position among these three seal lips 14b, 15a and 16d, is designed to have a base end portion, an intermediate portion and a tip end portion whose thicknesses satisfy the predetermined relationship to each other. Hence, in the case of this example, a phantom line segment "s" is designated such that it passes the center in the thickness direction throughout the entire length of the above outer seal lip 14b. Then, a point C is designated such that it is located in the center point between the base and tip ends A and B of this phantom line so that the length therefrom to the base end A is equal to the length therefrom to the tip end B. Also, the thickness of the above outer seal lip 14b is assumed to be t1 at the base end A, t2 at the center point C and t3 at the tip end B. Then, in this case, the respective thicknesses t1, t2 and t3 of the above outer seal lip 14b satisfy $0.70 < t2/t1 < 0.85$ and $0.35 < t3/t1 < 0.65$. Incidentally, while the above outer seal lip 14b may be provided with a notch, a projection or the like for several reasons, the above thicknesses t1, t2 and t3 are defined on the assumption that such a notch, a projection or the like does not exist. Also, in the case of this example, the above outer seal lip 14b corresponds to the axially oriented seal lip of the third aspect.

In the case of this example as constructed, the strain generated in the outer seal lip 14b can be reduced, and therefore it is possible to maintain the pressing force of this outer seal lip 14b to the slinger 6 constant in the long term use. Because of this, in accordance with the structure of this example, the improved sealing performance can be maintained in the long term use. Also, even when the inner race is tilted relative to the outer race, the outer seal lip 14b can satisfactorily follow the movement of the slinger 6 so that the sealing performance can be improved. The structures and the functionality of the other members are similar to those of the first example as illustrated in FIGS. 1 and 2, and therefore redundant explanation is not repeated.

Next, the result of a third simulation conducted by the inventors of the present invention to confirm the advantages of this example will be explained In this third simulation, the finite element method was applied for obtaining the maximum strain generated in the outer seal lip 14b on the basis of the ratio t2/t1 of the thickness t2 at the center point C to the thickness t1 at the base end A and the ratio t3/t1 of the thickness t3 at the tip end B to the thickness t1 at the base end A. Meanwhile, this simulation was performed by assigning 60 mm to the inner diameter d12 of the radially inner cylindrical portion 12 constituting the slinger 6, 80 mm to the outer diameter D9 of the radially outer cylindrical portion 9 constituting the metal core 5, and 4 mm to the entire width L17 of the seal assembly 17 after assembling. Also, 0.8 mm was assigned to the interference in the axial direction of the outer seal lip 14b with the inner surface of the outer circular ring portion 13 constituting the above slinger 6. The maximum strain generated in this outer seal lip 14b was then obtained with varying values of the thicknesses t1, t2 and t3 at the respective positions of this outer seal lip 14b on the assumption that the pressing force of this outer seal lip 14b (the force to urge the tip edge against the outer circular ring portion 13) is not changed.

Figure 14:
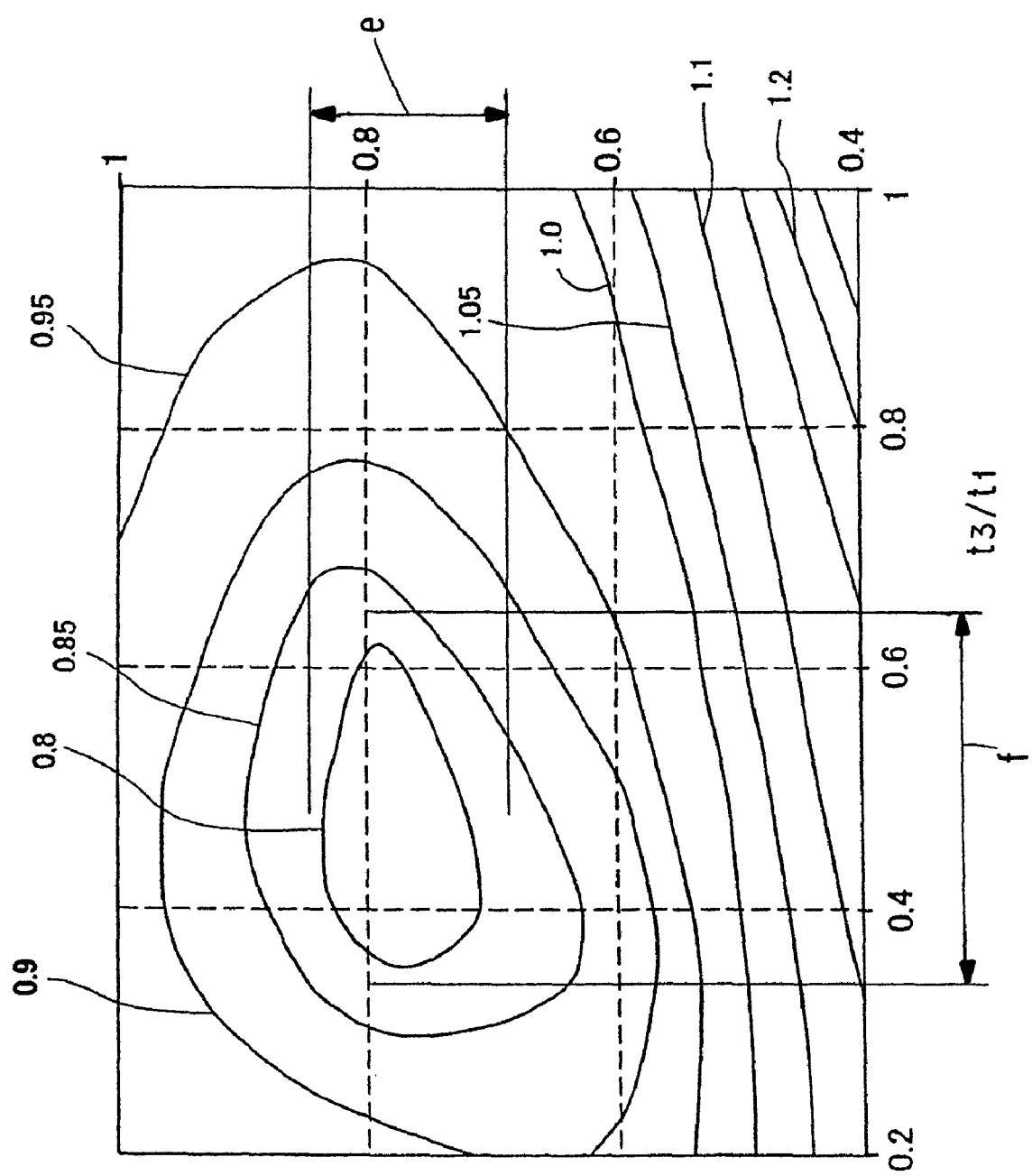
FIG. 14 is a view to show a relationship between the thickness at three locations of the outer seal lip and the maximum strain.

FIG. 14 shows the result of simulation conducted in this manner. Meanwhile, in FIG. 14, the numeral associated with each curve indicates the ratio of the maximum strain generated in the above outer seal lip 14b. This ratio was obtained by assigning "1" to the maximum strain generated in the outer seal lip 14b when the thickness t1 at the base end A, the thickness t2 at the center point C and the thickness t3 at the tip end B were set equal to each other under the condition as assumed above. Also, in the same figure, the arrow "e" indicates the range of the ratio t2/t1 of the above outer seal lip 14b in accordance with the third aspect of the present invention. Furthermore, the arrow "f" indicates the range of the ratio t3/t1 of the above outer seal lip 14b in accordance with the third aspect of the present invention. As apparent from the result of simulation as illustrated in FIG. 14, if the above ratios t2/t1 and t3/t1 fall within the ranges in accordance with the third aspect of the present invention, it is possible to minimize the maximum of strain generated in the above outer seal lip 14b.

Figure 15:
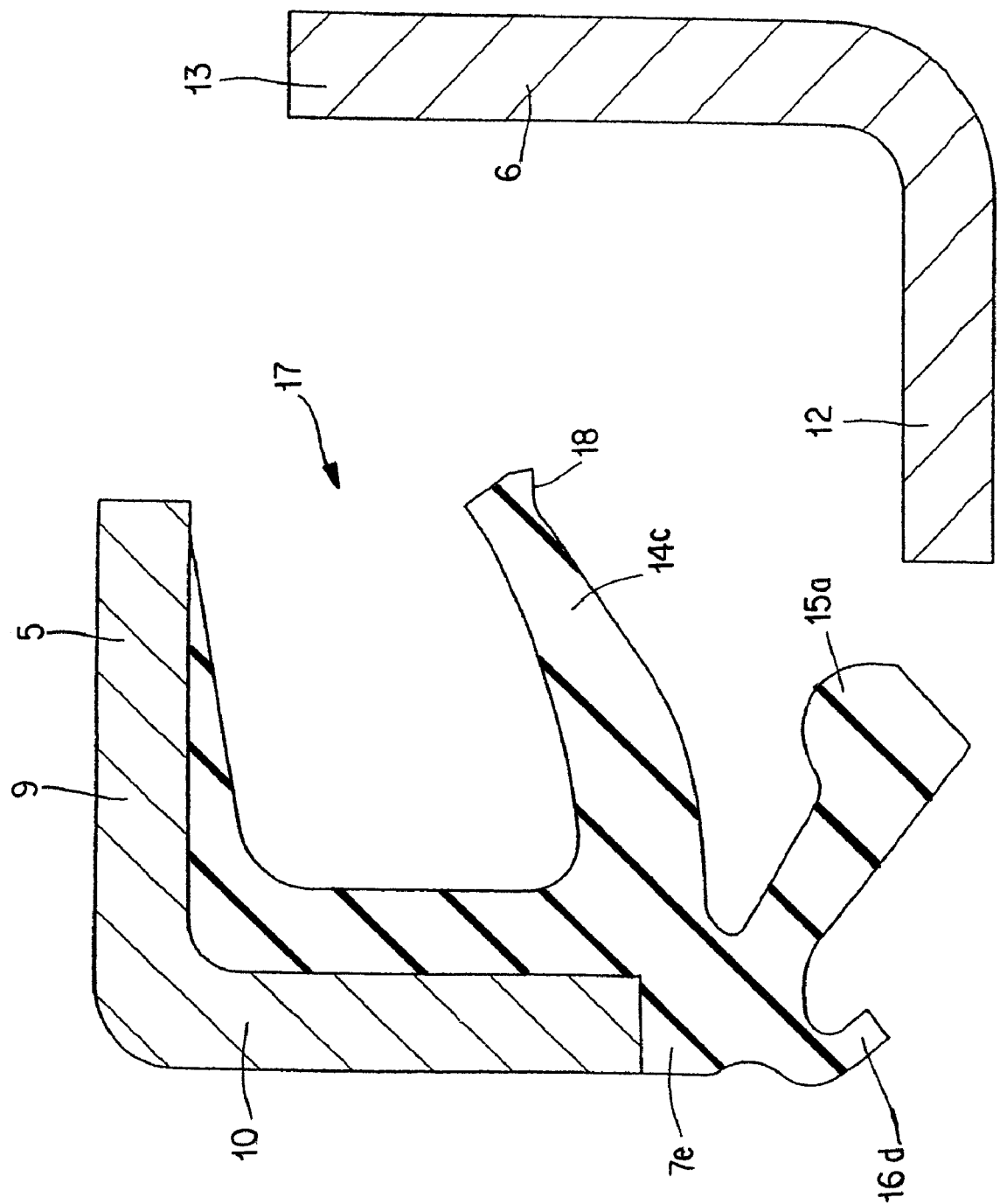
FIG. 15 is a partly cut away, cross sectional view of a fifth example of the embodiment of the present invention, similar to FIG. 2.
Figure 16:
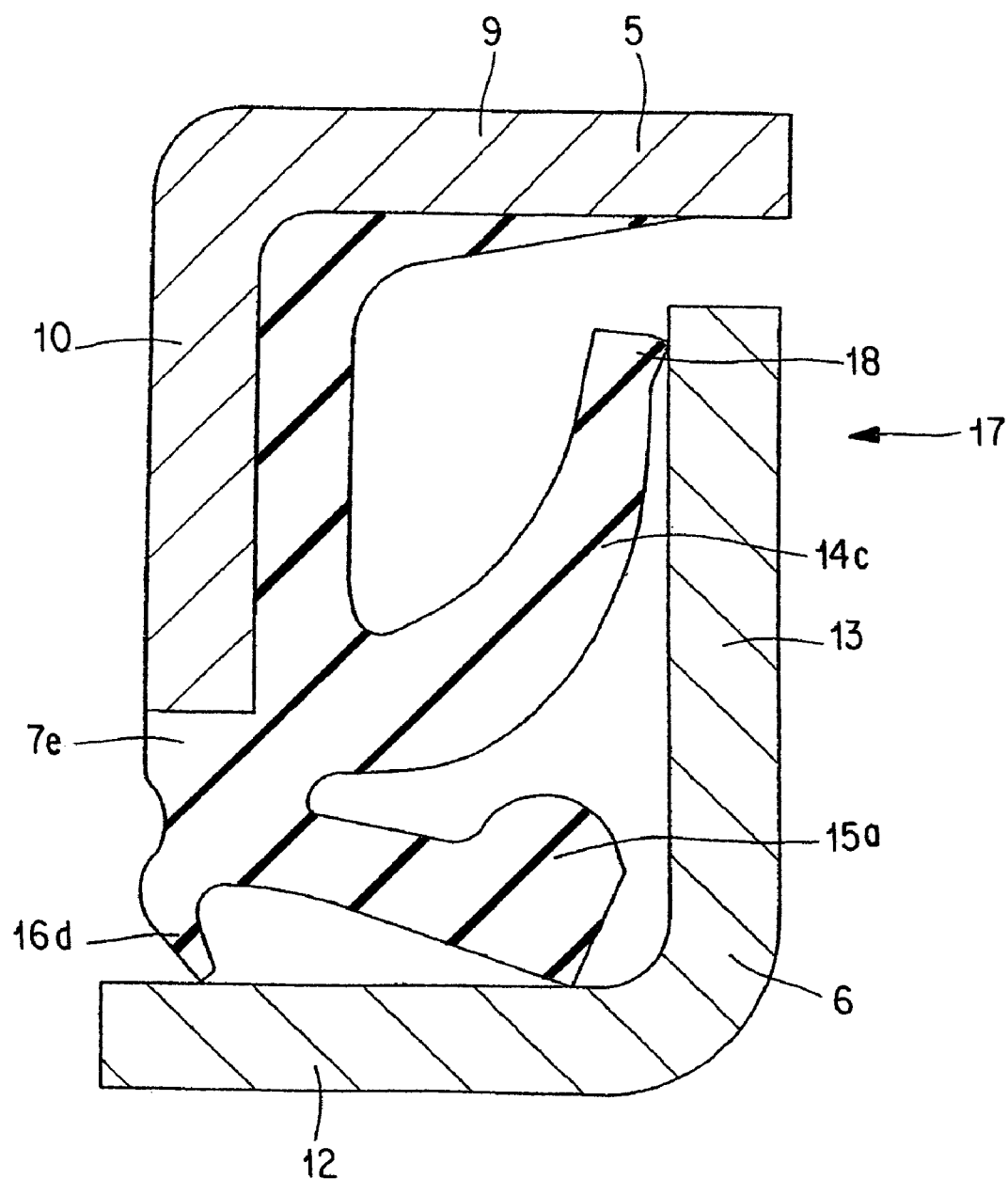
FIG. 16 is a cross sectional view of part of the assembled structure of the fifth example.

Next, FIGS. 15 and 16 show a fifth example of the embodiment of the present invention corresponding to the fourth and seventh aspects. In the case of this example, the thickness of the inner seal lip 16d constituting the sealing member 7e is designed to have the nearly same thickness throughout the entire length from the base end portion to the tip edge. Also, the thickness of the outer seal lip 14c, that is an axially oriented seal lip, is gradually decreasing from the base end portion to the tip edge. Then, a projection 18 having a sharp end is formed around the entire circumference on the side surface of the tip end portion of this outer seal lip 14c which is on the radially inward side in the free state thereof. The tip edge of this projection 18 is abutted to the inner surface of the outer circular ring portion 13 of this slinger 6 when the slinger 6 and the sealing member 7e on the metal core 5 as a support member are engaged by moving them close to each other as illustrated in FIG. 16. In the case of this example, since the above projection 18 is provided, even if the thickness of the tip end portion of the above outer seal lip 14c is relatively small or even when the slinger 6 and the sealing member 7e on the metal core 5 are located excessively close to each other in the axial direction as illustrated in FIG. 16, the tip end portion of the above outer seal lip 14c is prevented from being in surface-to-surface contact with the inner surface of the outer circular ring portion 13 to improve the sealing performance.

The structures and the functionality of the other members are similar to those of the first example as illustrated in FIGS. 1 and 2, and therefore redundant explanation is not repeated.

Figure 17:
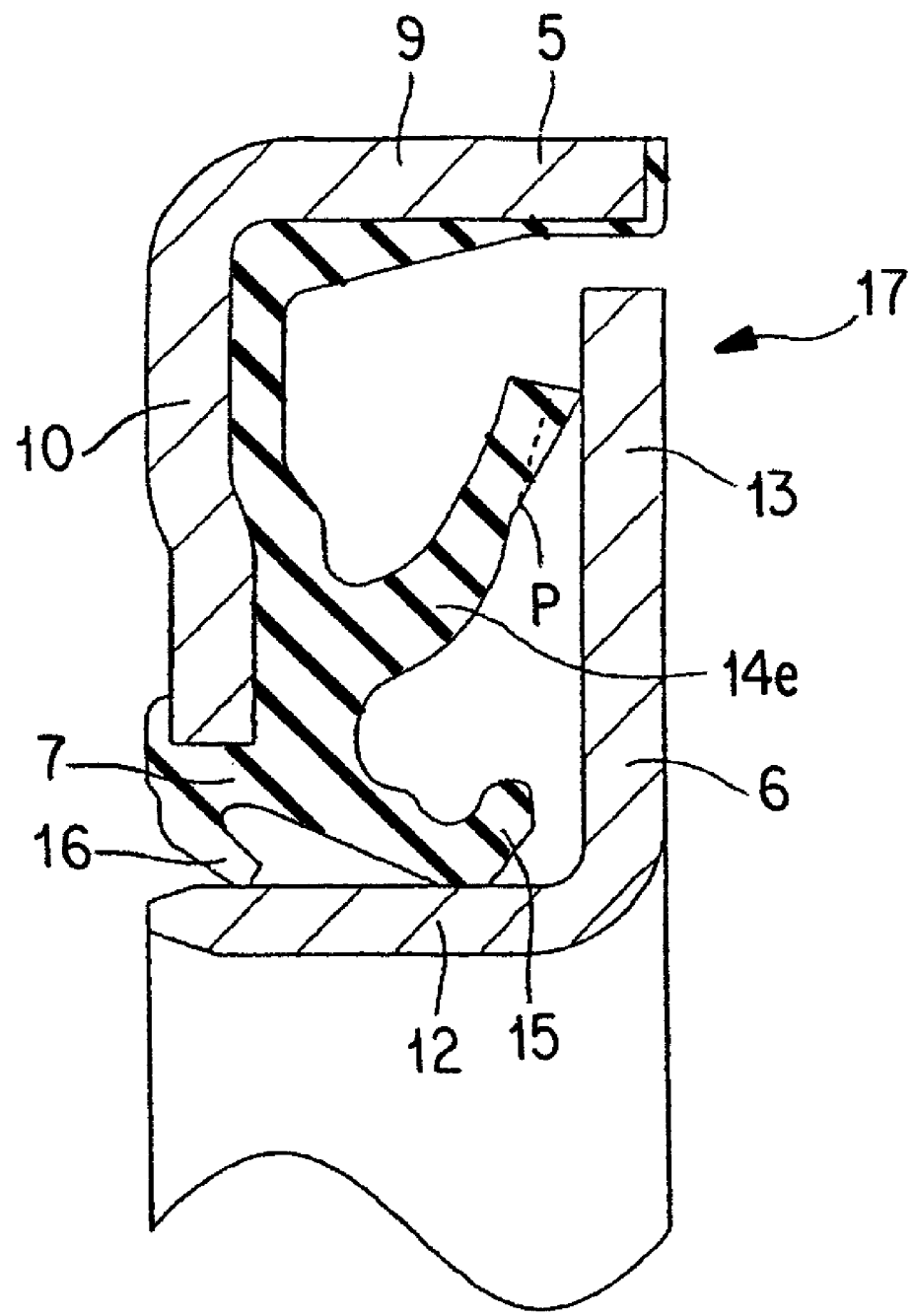
FIG. 17 is a partly cut away, cross sectional view of a sixth example of the embodiment of the present invention, similar to FIG. 2.
Figure 18:
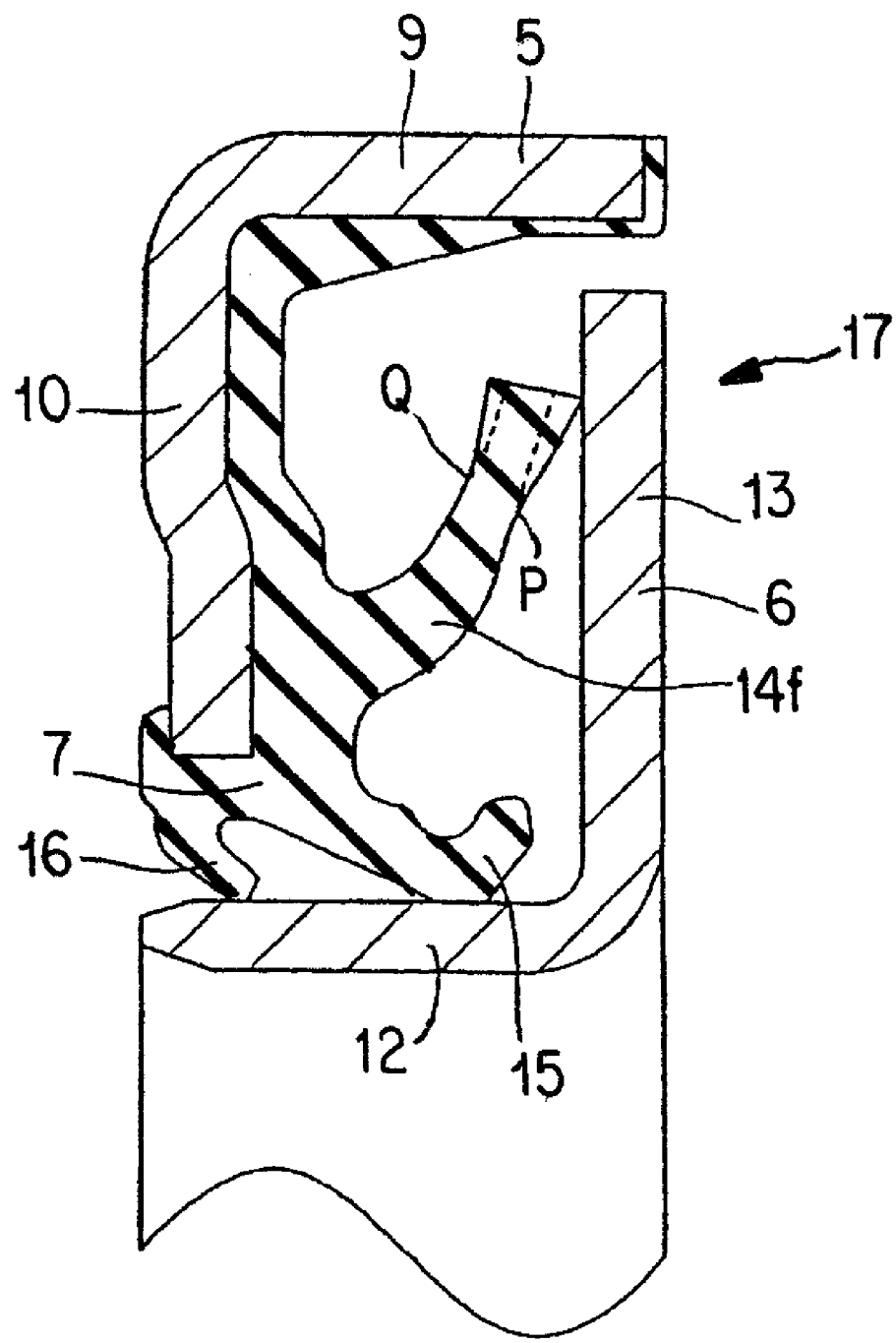
FIG. 18 is a partly cut away, cross sectional view of a seventh example of the embodiment of the present invention.

Next, FIGS. 17 and 18 show a sixth and a seventh example of the embodiment of the present invention corresponding to the fifth and seventh aspects. In the case of this example, the thicknesses of the outer seal lips 14e and 14f as the axially oriented seal lip are gradually increased toward the tip edge from a position of the intermediate portion closer to the tip end to prevent the tip end portion of these outer seal lips 14e and 14f from being excessively small in the thickness dimension, so that the thickness dimension of the tip end portions of the outer seal lips 14e and 14f can be secured even after abrasion.

Namely, in the case of the sixth example as illustrated in FIG. 17, the thickness dimension of this outer seal lip 14e is gradually increased toward the tip edge of the above outer seal lip 14e from a point P in the intermediate portion of the seal lip 14a. The point P is located at a location displaced a little to the tip end of the seal lip 14a from the center of the intermediate portion on the surface, which is one of the opposite surfaces of the outer seal lip 14e, that is opposed to the outer circular ring portion 13 of the slinger 6 in its use condition and that is located on the radially inner side in its free state. Also, in the case of the seventh example as illustrated in FIG. 18, the thickness of the outer seal lip 14f is gradually increased toward the tip edge of the above outer seal lip 14f from this point P similar as that of the above sixth example and from a point Q located in the opposite surface of the outer seal lip 14f approximately corresponding to the point P of the sixth example as described above. Meanwhile, the chained lines of the outer seal lips 14e and 14f drawn in FIGS. 17 and 18 indicate the profiles of the cross sections in the case where the thicknesses are not increased toward the tip edges from the points P and Q. The reason of increasing the thicknesses of the tip edges of the outer seal lips 14e and 14f is as follows.

It is considered as the cause of the degradation of the sealing performance of the above outer seal lips 14e and 14f that foreign matters enter the slidably contacting region between the outer circular ring portion 13 of the slinger 6 and the surface of the tip edge of this outer seal lip 14e or 14f that is located on the radially inner side in its free state to cause the abrasion in the side surface of this outer circular ring portion 13 and in the tip edge of this outer seal lip 14e or 14f so as to decrease the pressing force of these outer seal lips 14e and 14f. In the case of this example, since the tip edges of this outer seal lips 14e and 14f are made thick, the decrease in the pressing force and the fatigue of these outer seal lips 14e and 14f can be suppressed even if foreign matters enter the slidably contacting region between the tip edges of the outer seal lips 14e and 14f and the side surface of the above outer circular ring portion 13 to cause the abrasion of the side surface of the outer circular ring portion 13 and the tip edges of this outer seal lip 14e and 14f. Incidentally, it is possible to combine the structure of the outer seal lips 14e and 14f according to this example with the structures of the respective intermediate and inner seal lips according to the first to fifth examples as described above.

Figure 25:
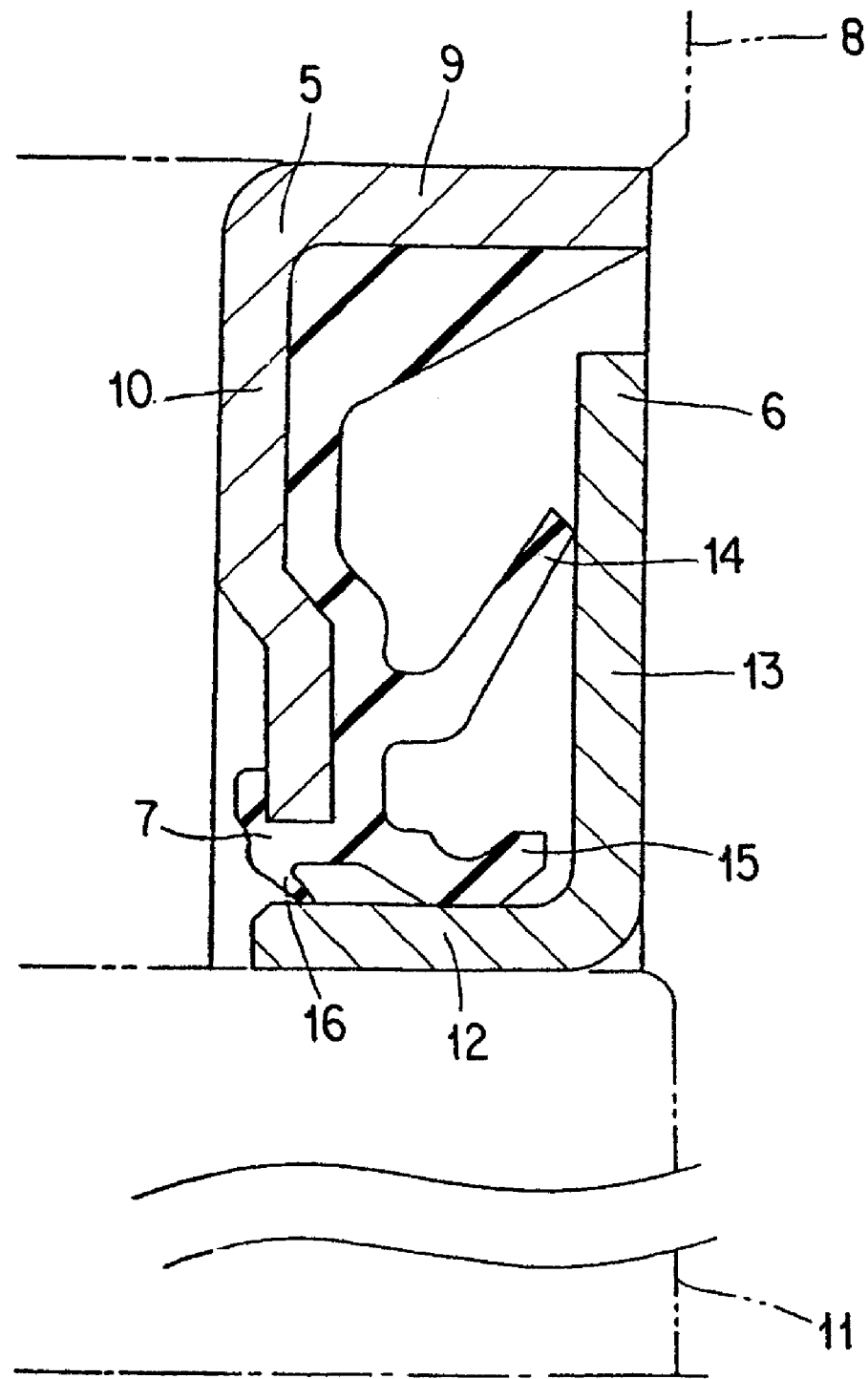
FIG. 25 is a cross sectional view of part of a first example of the conventional structure.
Figure 26:
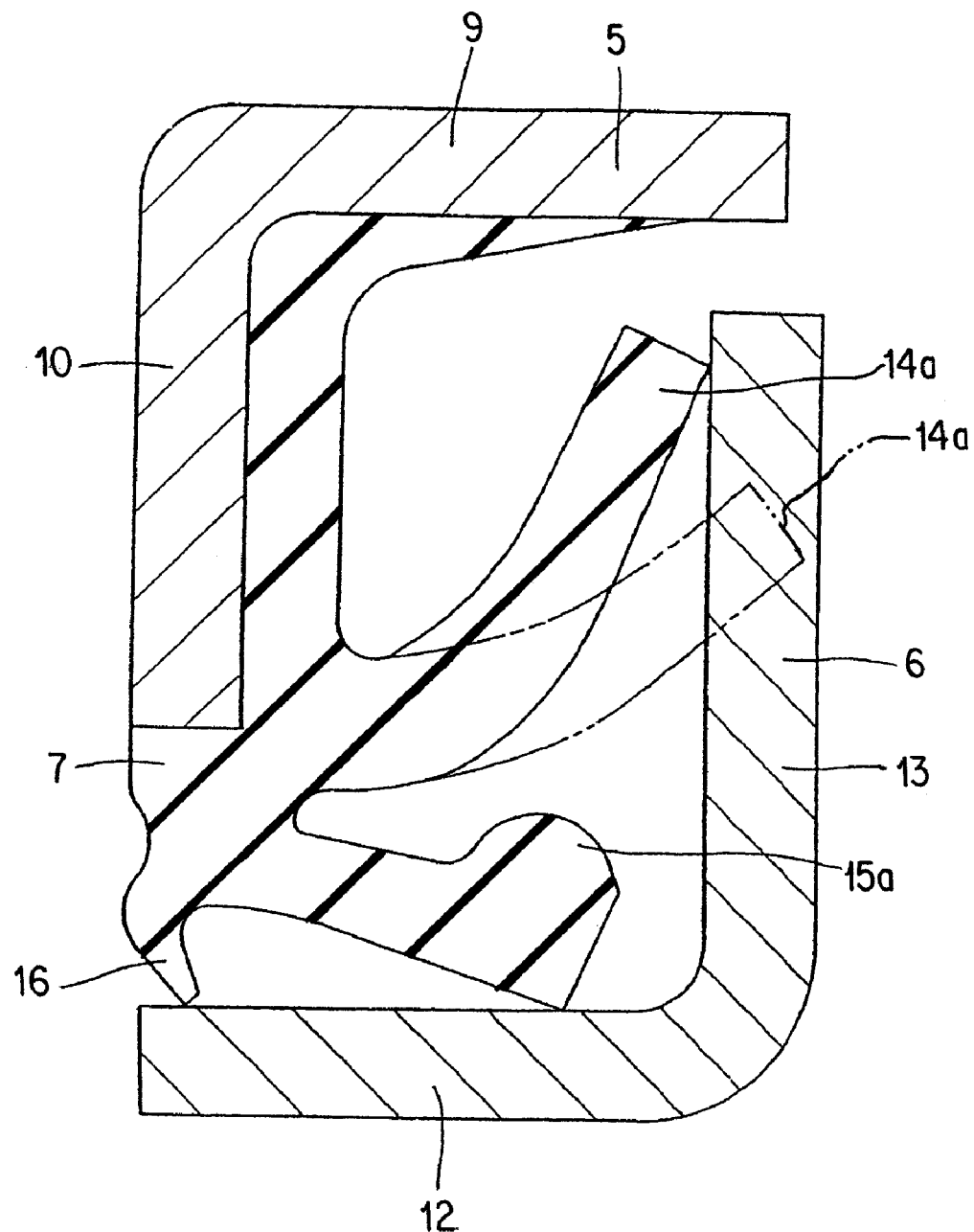
FIG. 26 is a cross sectional view of part of a second example of the conventional structure.
Figure 27:
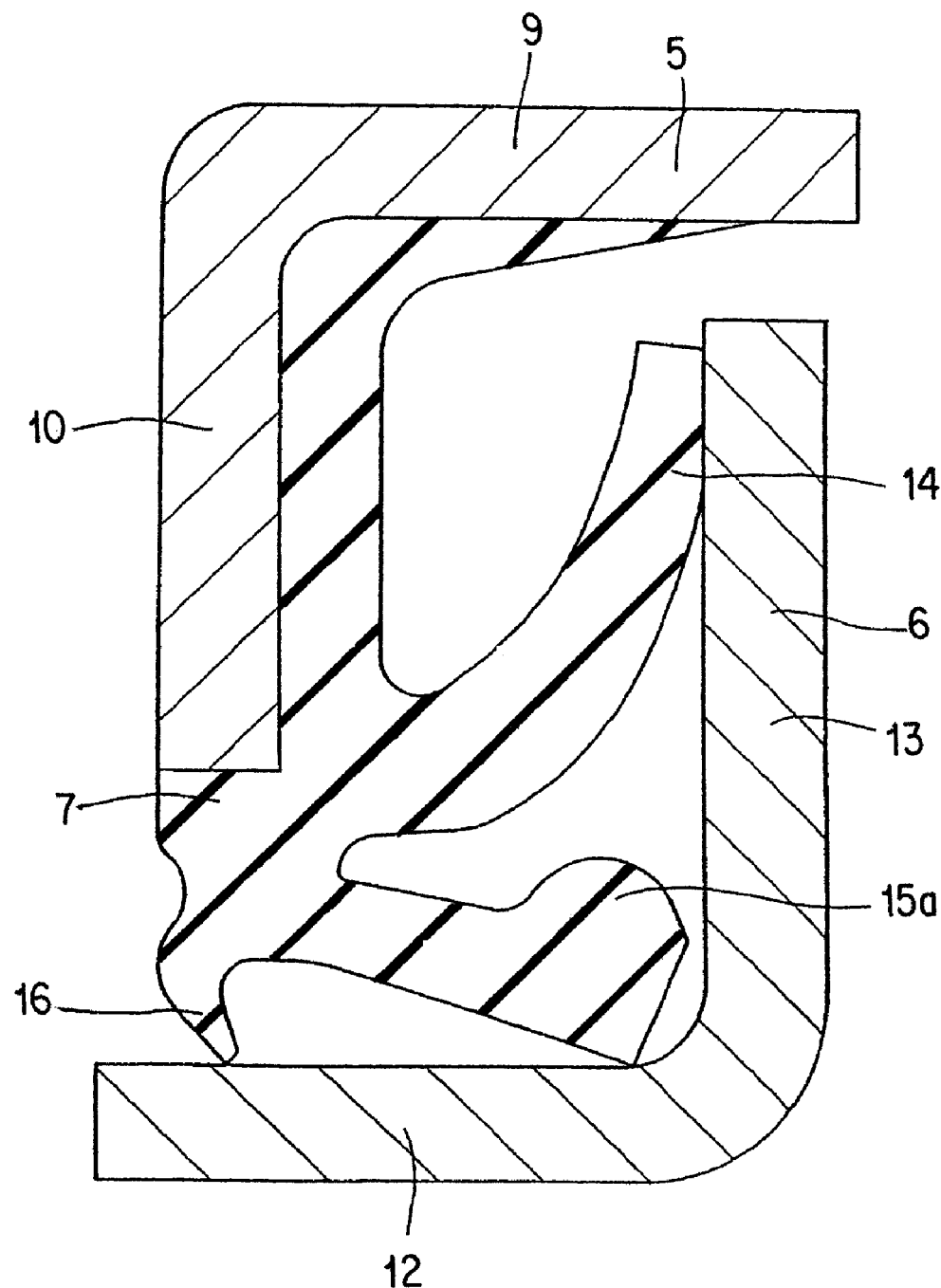
FIG. 27 is a cross sectional view of part of a third example of the conventional structure.

The structures and the functionality of the other members are similar to those of the first example of the prior art structure as illustrated in FIG. 25, and therefore redundant explanation is not repeated, while like reference numbers indicate functionally similar elements.

Figure 19:
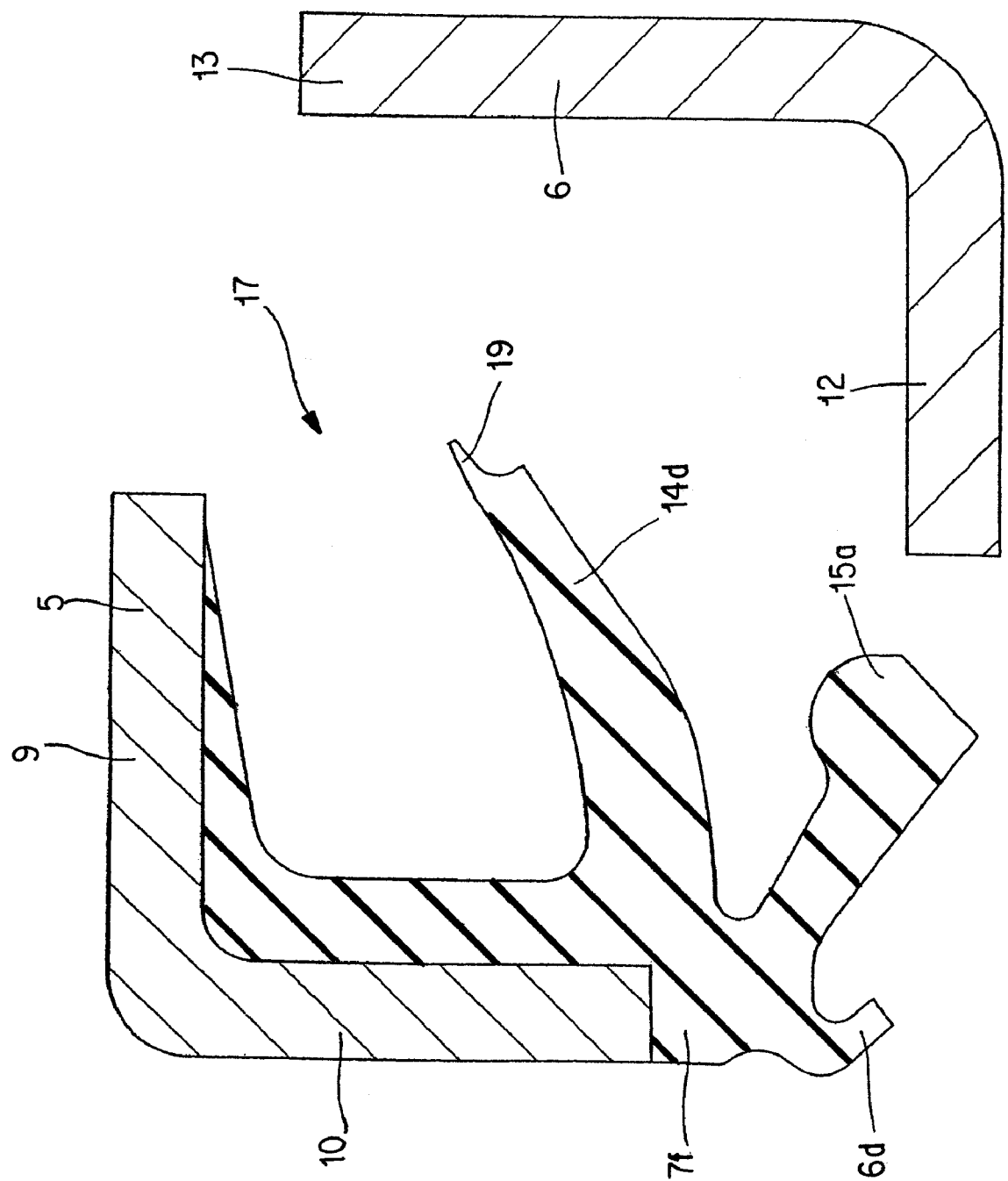
FIG. 19 is a partly cut away, cross sectional view of an eighth example of the embodiment of the present invention, similar to FIG. 2.
Figure 20:
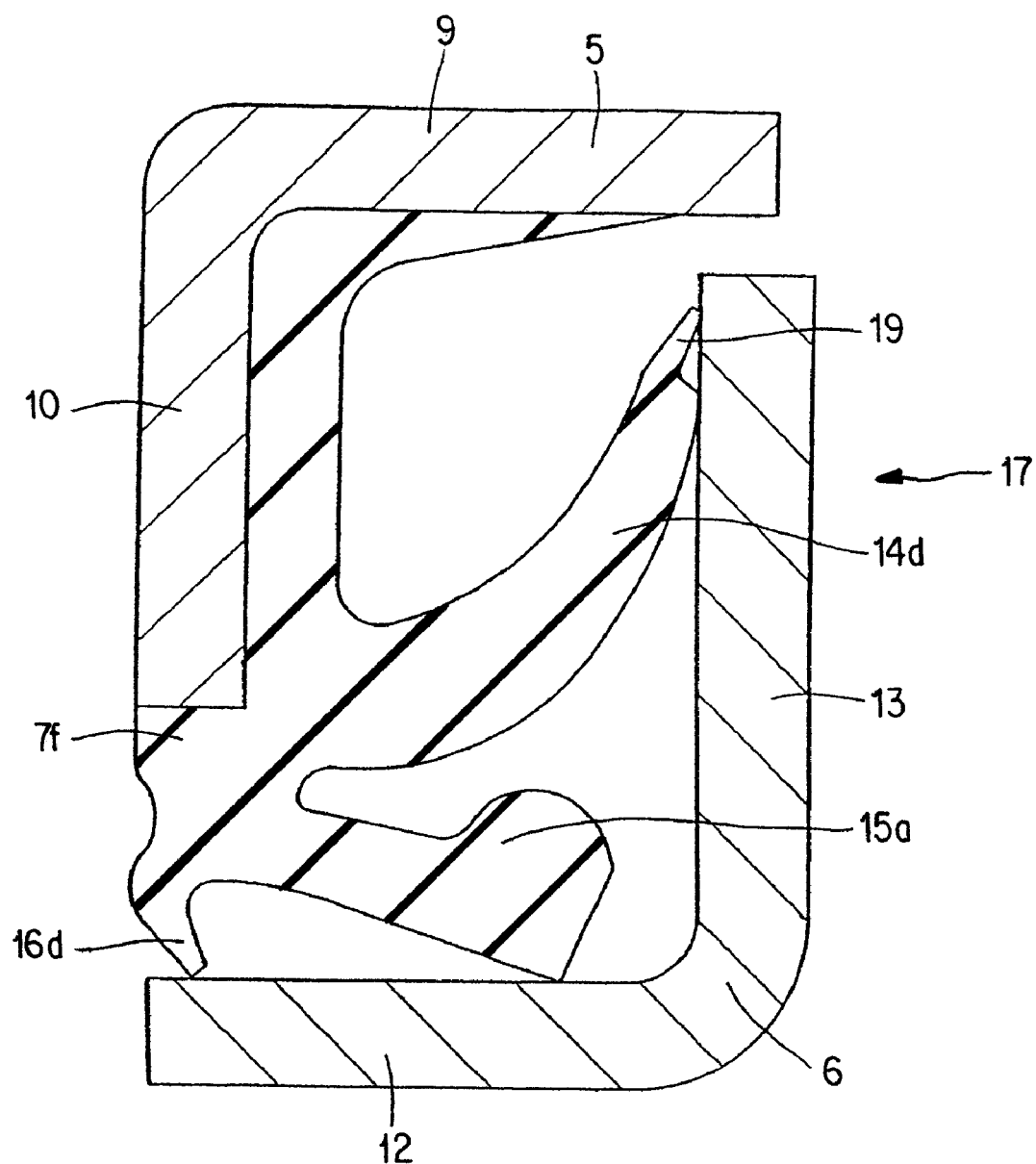
FIG. 20 is a cross sectional view of part of the assembled structure of the eighth example.

Next, FIGS. 19 and 20 show an eighth example of the embodiment of the present invention corresponding to the sixth and seventh aspects. In the case of this example, the thickness of the inner seal lip 16d constituting the sealing member 7f is designed to have the nearly same thickness throughout the entire length from the base end portion to the tip edge. Also, the thickness of the outer seal lip 14d is gradually decreasing from the base end portion to the tip edge. Furthermore, an auxiliary seal lip 19 is provided on the radially outer end of the tip edge of this outer seal lip 14d to project from this tip edge. Then, when the slinger 6 and the sealing member 7f on the metal core 5 as a support member are engaged as illustrated in FIG. 20, the tip edge of the above auxiliary seal lip 19 comes in slidably contact with the inner surface of the outer circular ring portion 13, as well as the radially inner edge of the tip end portion of the above outer seal lip 14d which is radially inwardly displaced from the above auxiliary seal lip 19 comes in slidably contact with the inner surface of the outer circular ring portion 13.

In the structure according to this example, by virtue of the above auxiliary seal lip 19, it is possible to prevent foreign matters from entering the slidably contacting region between the radially inner end of the tip end portion of the above outer seal lip 14d and the inner surface of the above outer circular ring portion 13. Because of this, the abrasion of this slidably contacting region can be suppressed by preventing hard foreign matters from being bitten by this slidably contacting region. Accordingly, in the case of this example, the sealing performance can be improved. In addition to this, since the above auxiliary seal lip 19 is formed to project from the tip edge of the above outer seal lip 14d, the cost does not substantially rise. Meanwhile, the above auxiliary seal lip 19 sufficiently works as long as it prevents the entrance of foreign matters, and therefore the pressing force of this auxiliary seal lip 19 need not be large. Because of this, it is possible to make small or null the abrasion at the slidably contacting region between the tip edge of this auxiliary seal lip 19 and the inner surface of the above outer circular ring portion 13. Also, even if there is some abrasion at this slidably contacting region, no influence thereof is exerted upon the sealing performance of the slidably contacting region between the radially inner end of the tip edge of the above outer seal lip 14d and the inner surface of the outer circular ring portion 13. Also, since the pressing force of the above auxiliary seal lip 19 can be small, it is possible to prevent the pressing force of the above outer seal lip 14d from decreasing because of the provision of this auxiliary seal lip 19.

Figure 21:
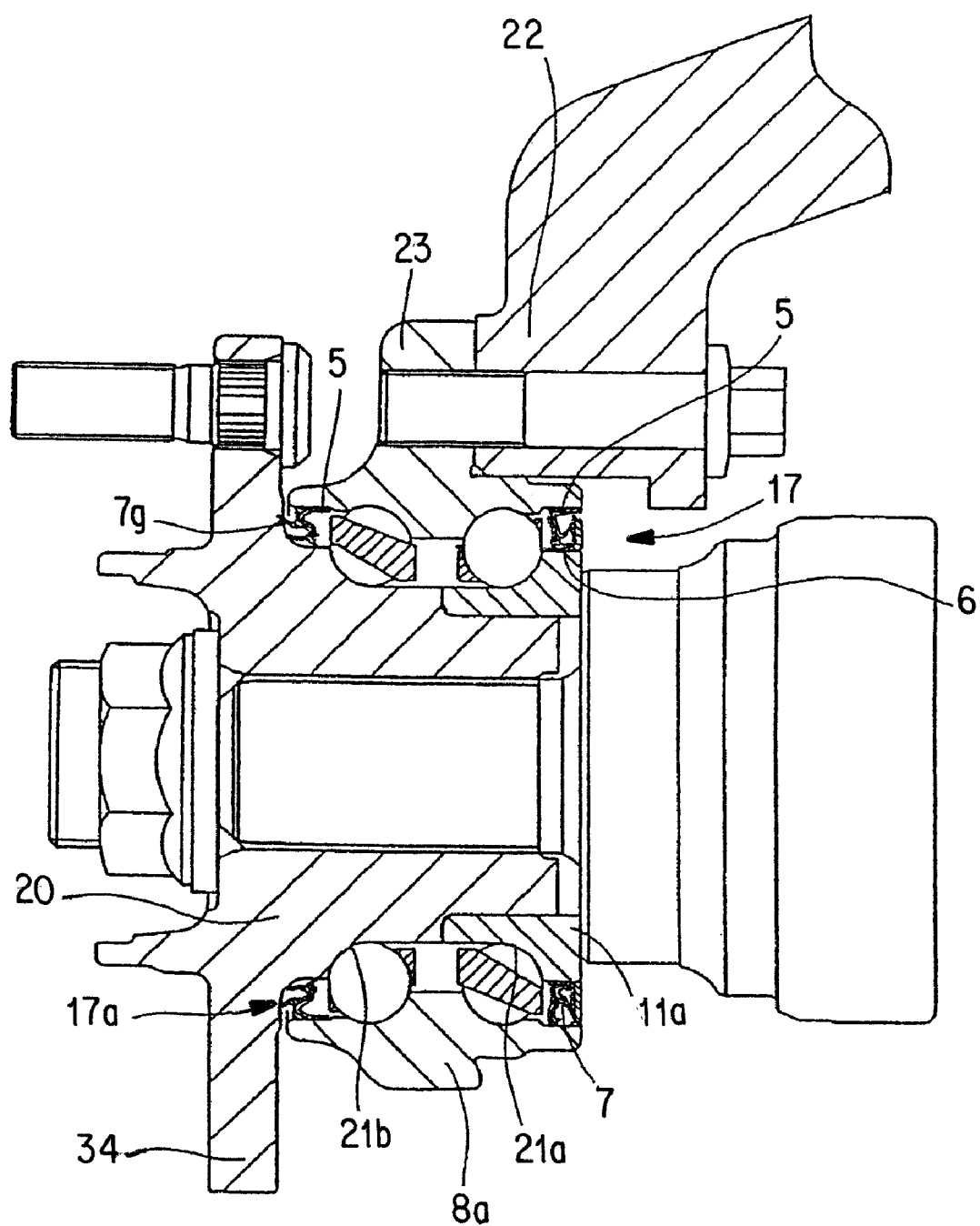
FIG. 21 is cross sectional view to show a hub unit with a sealing assembly of the present invention installed in it.

Incidentally, the seal assembly according to the present invention and the rolling bearing implemented therewith can be applied to the case where either the inner or outer race constituting the rolling bearing rotates at the time of use. Also, the seal assembly according to the present invention and the rolling bearing implemented therewith can be used in a hub unit by fitting and fixing the inner race onto the outer peripheral surface of the hub of the hub unit which supports the wheel, and by fitting and fixing the outer race into the supporting hole of a knuckle of the suspension of a motor vehicle. Also, in this case, the outer peripheral surface of the above outer race may be formed with a fixed side flange to be fixed to the end surface of the above knuckle. Furthermore, as illustrated in FIG. 21, the seal assembly 17 according to the present invention is implemented in a hub unit in which an inner race 11a having an inner raceway 21a in its outer peripheral surface is externally fitted and fixed onto the outer peripheral surface of the inner end of a hub 20, and an inner raceway 21*b* is formed on the outer peripheral surface of the intermediate portion of the above hub 20 in the location apart from this inner race 11*a*. Incidentally, in the case of the hub unit as shown in FIG. 21, a fixed side flange 23 to be fixed to the end surface of the knuckle 22 is formed on the outer peripheral surface of the outer race 8*a*. Also, a rotation side flange 34 for fixing a wheel thereto is formed on the outer peripheral surface of the above hub 20 at a location displaced a little to the outer end thereof.

Also, in the respective examples as described above, it is possible to externally fit and fix the slinger 6 constituting the seal assembly 17 onto the outer peripheral surface of the hub 20 constituting the above hub unit, in place of the inner races 11 and 11*a* (FIGS. 9 and 19).

Figure 22:
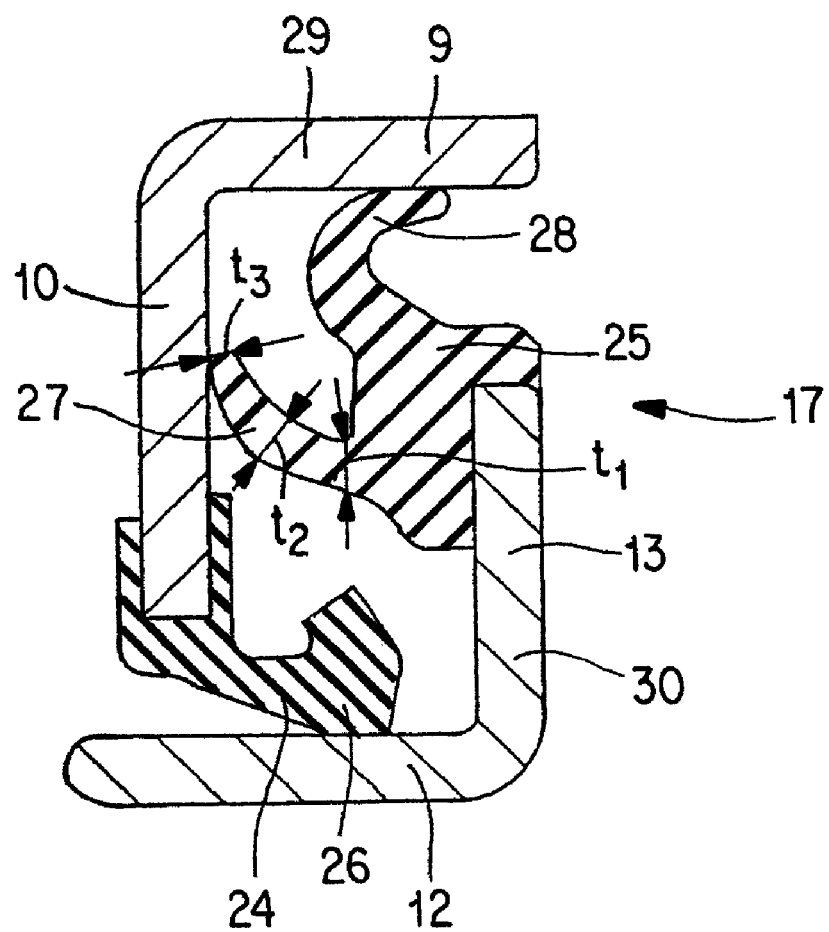
FIG. 22 is a partly cut away, cross sectional view of a ninth example of the embodiment of the present invention.

Next, FIG. 22 shows a ninth example of the embodiment of the present invention corresponding to the second, third and seventh aspects. In the case of this example, while the base end portion of a first sealing member 24 is securely connected to the radially inner end of a first metal core 29 having an L-shaped cross section and internally fitted and fixed to the end portion of the outer race, the base end portion of a second sealing member 25 is securely connected to the radially outer end of a second metal core 30 having an L-shaped cross section and externally fitted and fixed to the end portion of the inner race. Then, the first sealing member 24 fixed to the above first metal core 29 is formed with an inner seal lip 26 which is a radially oriented seal lip, and the tip edge of this inner seal lip 26 comes in slidably contact with the outer peripheral surface of the radially inner cylindrical portion 12 constituting the above second metal core 30. On the other hand, the second sealing member 25 fixed to the above second metal core 30 is formed with an intermediate seal lip 27 which is an axially oriented seal lip and an outer seal lip 28. The outer seal lip 28 among them is located in a radially outer position than the above intermediate seal lip 27. Then, while the tip edge of this intermediate seal lip 27 is arranged to come in slidably contact with a radially intermediate portion of the axially oriented outer surface of the inner circular ring portion 10 constituting the above first metal core 29, the tip edge of the above outer seal lip 28 is arranged to come in slidably contact with the inner peripheral surface of the radially outer cylindrical portion 9 constituting the above first metal core 29.

Then, the predetermined relationship is established between two interferences, i.e., the radial interference in the radial direction of the inner cylindrical portion 12 between the tip edge of the above inner seal lip 26 and the outer peripheral surface of the inner cylindrical portion 12 constituting the above second metal core 30, and the axial interference in the axial direction of the inner circular ring portion 10 between the tip edge of the above intermediate seal lip 27 and the outer surface of the inner circular ring portion 10 constituting the above first metal core 29. Furthermore, in the case of this example, the thickness t1 of the base end portion of the above intermediate seal lip 27, the thickness t2 of the intermediate portion thereof and the thickness t3 of the tip end thereof satisfy $0.70 < t2/t1 < 0.85$ and $0.35 < t3/t1 < 0.65$.

The structures and the functionality of the other members are similar to those of the third example as illustrated in FIG. 9 and those of the fourth example as illustrated in FIGS. 12 and 13, and therefore redundant explanation is not repeated.

Meanwhile, it is possible to practice the inventions according to the fourth to sixth and eighth aspects with two sealing members respectively having a seal lip (s) joined to separate metal cores as described above.

Figure 23:
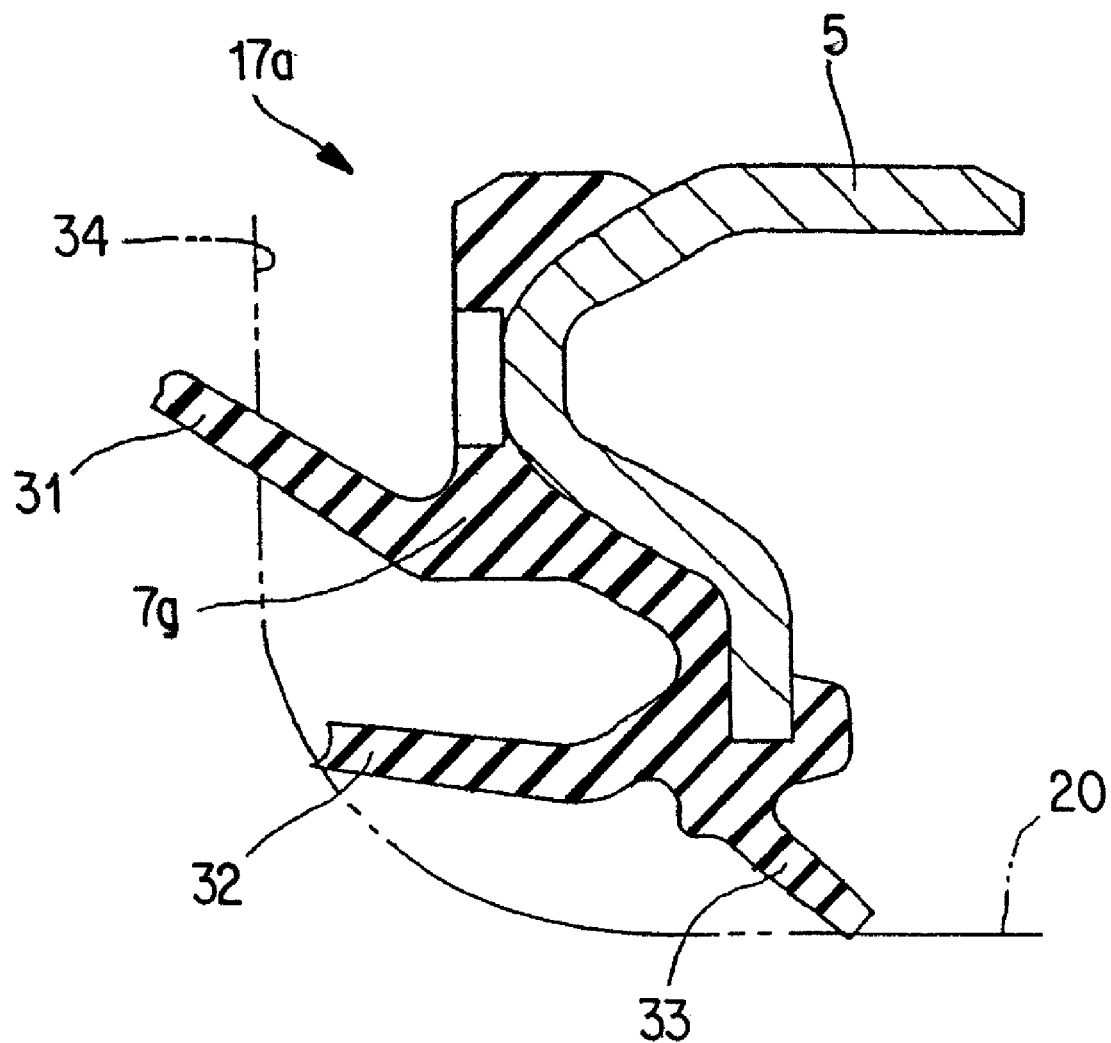
FIG. 23 is a partly cut away, cross sectional view of a tenth example of the embodiment of the present invention.

Next, FIG. 23 shows a tenth example of the embodiment of the present invention corresponding to the third and eighth aspects. The seal assembly 17*a* in accordance with this example is used to seal between the inner peripheral surface of the outer end portion of the outer race 8*a* and the intermediate outer peripheral surface of the hub 20 constituting the hub unit as described in FIG. 21, and composed of a metal core 5 which can be internally fitted and fixed to the outer peripheral surface of the end portion of this outer race 8*a* and a sealing member 7*g* made of a resilient material with its base end portion attached to this metal core 5. Then, this sealing member 7*g* is provided with three seal lips 31 to 33 having tip edges arranged to come in slidably contact with the outer peripheral surface of the above hub 20. The outer seal lip 31 located in the outermost position and the intermediate seal lip 32, in an intermediate position, among these seal lips 31 to 33, are arranged to have their tip edges come in slidably contact with a side surface inwardly oriented in the axial direction of the rotation side flange 34 provided on the outer peripheral surface of the above hub 20. Also, the inner seal lip 33, which is located in the innermost position, is arranged to have its tip edge come in slidably contact with the outer peripheral surface of the intermediate portion of the above hub 20. Then, in the case of this example, the predetermined relationship in thickness is established among the base end portion, the tip end and the intermediate portion of each of the above outer seal lip 31 and the intermediate seal lip 32. In the case of this example, the outer and intermediate seal lips 31 and 32 correspond to the axially oriented seal lip according to the third aspect.

The structures and the functionality of the other members are similar to those of the fourth example as illustrated in FIGS. 12 and 13, and therefore redundant explanation is not repeated.

Incidentally, it is possible to practice the inventions according to the first and fourth to seventh aspects with the structure as described above in which the tip edge of each of the seal lips 31 to 33 comes in slidably contact with the outer peripheral surface of the hub 20 or the inner race 11 or 11*a* (FIGS. 9 and 21).

Figure 24:
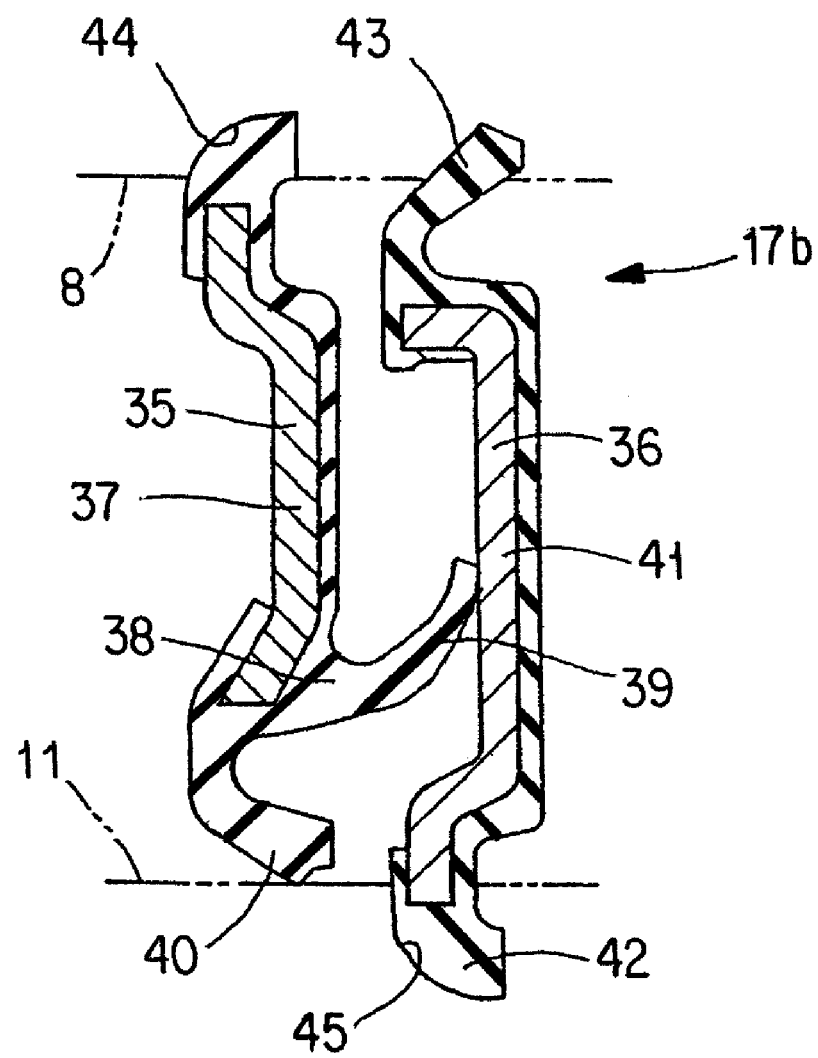
FIG. 24 is a partly cut away, cross sectional view of an eleventh example of the embodiment of the present invention.

Next, FIG. 24 shows an eleventh example of the embodiment of the present invention corresponding to the third and seventh aspects. The seal assembly 17*b* according to this example is provided with a first seal ring 35 and a second seal ring 36. The first seal ring 35 is provided with a first metal core 37, and a first sealing member 38 with a portion being securely connected to this first metal core 37, an intermediate seal lip 39 and an inner seal lip 40 which are formed at radially inwardly displaced locations of this first sealing member 38. Also, the above second seal ring 36 is provided with a second metal core 41, a second sealing member 42 having a portion securely connected to this second metal core 41, and an outer seal lip 43 formed at a radially outwardly displaced location of this second sealing member 42.

Also, while the radially outer end of the above first seal ring 35 is engaged with an engaging groove 44 formed in the inner peripheral surface of the end portion of the outer race 8, the radially inner end of the above second seal ring 36 is engaged with an engaging groove 45 formed in the outer peripheral surface of the inner race 11. In this state, the above first seal ring 35 and the second seal ring 36 are located opposed to each other in the axial direction. Then, the tip edge of the intermediate seal lip 39 of this first seal ring 35 is arranged to come in slidably contact with the radially inwardly oriented side surface of the second metal core 41 constituting the above second seal ring 36. Also, while the tip edge of the inner seal lip 40 of the above first seal ring 35 is arranged to come in slidably contact with the outer peripheral surface of the above inner race 11, the tip edge of the outer seal lip 43 of the above second seal ring 36 is arranged to come in slidably contact with the inner peripheral surface of the above outer race 8. By this configuration, the space between the outer peripheral surface of the end portion of the above inner race 11 and the inner peripheral surface of the end portion of the outer race 8 is tightly closed.

Then, in the case of this example, the predetermined relationship in thicknesses is established among the base end portion, the tip end and the intermediate portion of the above intermediate seal lip 39. In the case of this example, this intermediate seal lip 39 corresponds to the axially oriented seal lip according to the third aspect.

The structures and the functionality of the other members are similar to those of the fourth example as illustrated in FIGS. 12 and 13, and therefore redundant explanation is not repeated.

Incidentally, it is also possible to practice the inventions according to the fourth, fifth, sixth and eighth aspects as a seal assembly having the structure in which two seal rings are located opposed to each other in the axial direction as described above.

INDUSTRIAL APPLICABILITY

Since the present invention is constructed and operated as mentioned above, it is possible to realize a seal assembly for rolling bearing having an excellent sealing performance and high durability. For this reason, it is possible to prevent various types of foreign matters such as rain water, mud, dust and the like from entering the inside of the rolling bearing, and thereby to improve the durability of the rolling bearing.

What is claimed is:

1. A rolling bearing for supporting a wheel of an automobile comprising:

an inner race having an outer peripheral surface formed with an inner raceway;

an outer race having an inner peripheral surface formed with an outer raceway;

a plurality of rolling members provided between the inner raceway and outer raceway for relative rotation between the inner race and outer race; and a seal assembly having a support member and a seal member to cover a space between the outer peripheral surface at the end of the inner race and the inner peripheral surface at the end of the outer race, the support member being fixed to the inner peripheral surface at the end of the outer race, the seal member having three seal lips, including an inner seal lip, an intermediate seal lip and an outer seal lip, made of resilient material and a portion connected and fixed to the support member, the outer seal lip of the seal member being located at the outermost location in the three seal lips, the inner seal lip being located at the innermost location in the three seal lips and an intermediate seal lip being located adjacent to the inner seal lip on the axially outer side thereof, the outer peripheral surface at the end of the inner race supporting a member which is formed in a generally annular ring shape having an L-shaped cross section, a radially cylindrical portion fitted to the outer peripheral surface of the inner race, and an outer circular ring portion being bent in the radial direction from the edge at the axially outer end of the radially cylindrical portion, the radially cylindrical portion having a radially oriented peripheral surface, the inner seal lip and intermediate seal lip having a tip edge which comes into sliding contact with the radially oriented peripheral surface and the outer seal lip having a tip edge which comes into sliding contact with an inner surface of the outer circular ring portion, wherein the radially oriented peripheral surface has an outer diameter of about 40 mm to 70 mm, wherein, provided that d1 is the thickness of the tip edge of the intermediate seal lip, that d2 is the thickness of the base end of the intermediate seal lip, that D1 is the thickness of the tip edge of the inner seal lip, that D2 is the thickness of the base end of the inner seal lip, the relations in thickness of $0.2 \cdot d1 \leq d2 \leq 0.8 \cdot d1$ and of $0.5 \cdot D1 \leq D2 < D1$ are satisfied in at least a portion of the base end of the intermediate seal lip and inner seal lip, wherein the inner seal lip experiences no or slight resilient deformation with substantially zero interference when the tip edge of the inner seal lip and intermediate seal lip comes into sliding contact with the radially oriented peripheral surface.

2. A rolling bearing for supporting a wheel of an automobile described in claim 1, wherein all the seal lips are tilted outwardly in the axial direction of the rolling bearing toward the tip edges thereof respectively.

3. A rolling bearing for supporting a wheel of an automobile described in claim 1, wherein the respective tip edges of the inner seal lip and intermediate seal lip comes into sliding contact with the radially oriented peripheral surface of the radially cylindrical portion, and the tip edge of the inner seal lip has an inner diameter in its free state that is no smaller than the outer diameter of the radially oriented peripheral surface of the radially cylindrical portion minus 0.5 mm and no larger than the outer diameter of the radially oriented peripheral surface of the radially cylindrical portion plus 0.2 mm.

* * * * *